US012654464B2

(12) United States Patent
Nakajima et al.

(10) Patent No.: US 12,654,464 B2
(45) Date of Patent: Jun. 16, 2026

(54) LIQUID EJECTION HEAD AND PRINTING APPARATUS

(71) Applicant: CANON KABUSHIKI KAISHA, Tokyo (JP)

(72) Inventors: Takayuki Nakajima, Kanagawa (JP); Keisuke Iinuma, Kanagawa (JP); Tatsuo Nanjo, Kanagawa (JP); Wataru Takahashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 56 days.

(21) Appl. No.: 18/764,738

(22) Filed: Jul. 5, 2024

(65) Prior Publication Data

US 2025/0010633 A1 Jan. 9, 2025

(30) Foreign Application Priority Data

Jul. 7, 2023 (JP) ................................ 2023-112261
Apr. 17, 2024 (JP) ................................ 2024-066874

(51) Int. Cl.

| | |
|---|---|
| ***B41J 2/19*** | (2006.01) |
| ***B41J 2/175*** | (2006.01) |
| *B41J 2/14* | (2006.01) |
| *B41J 29/02* | (2006.01) |

(52) U.S. Cl.

CPC ................ *B41J 2/19* (2013.01); *B41J 2/175* (2013.01); *B41J 2/17563* (2013.01); *B41J 2/14* (2013.01); *B41J 2002/14306* (2013.01); *B41J 2002/14467* (2013.01); *B41J 29/023* (2013.01); *B41J 2202/07* (2013.01)

(58) Field of Classification Search

CPC . B41J 2/19; B41J 2/175; B41J 2/17563; B41J 2/14; B41J 29/023; B41J 2002/14306; B41J 2002/14467; B41J 2202/07

See application file for complete search history.

(56) References Cited

U.S. PATENT DOCUMENTS 8,162,460 B2 * 4/2012 Amma ................ B41J 2/17513 347/66
9,409,404 B2 * 8/2016 Fukuda ...................... B41J 2/14
2005/0068385 A1 * 3/2005 Nanjo .................. B41J 2/17523 347/85
2023/0103488 A1 * 4/2023 Aizawa .................. B41J 2/1404 347/14

FOREIGN PATENT DOCUMENTS

JP 2008-260199 A 10/2008

* cited by examiner

*Primary Examiner* — Henok D Legesse
(74) *Attorney, Agent, or Firm* — Venable LLP

(57) ABSTRACT

A liquid ejection head can be formed to be thinner than previous designs even in a case where multiple flow channels are arranged. In a state where the liquid ejection head is in use, a first upstream flow channel has a first region located above a first downstream flow channel vertically and a sectional area of the first upstream flow channel decreases downwards vertically. A second upstream flow channel has a second region located above a second downstream flow channel vertically and a sectional area of the second upstream flow channel decreases downwards vertically. As viewed in the first direction, the first downstream flow channel and the second downstream flow channel do not overlap with each other, while the first region and the second region overlap with each other.

14 Claims, 19 Drawing Sheets

LIQUID EJECTION HEAD AND PRINTING APPARATUS

BACKGROUND OF THE INVENTION

Field of the Invention

The present disclosure relates to a liquid ejection head and a printing apparatus.

Description of the Related Art

Some printing apparatuses that perform printing by ejecting liquid to a printing medium use a liquid ejection head which has a liquid storage chamber and a liquid ejection unit that are integral with each other and is attachable to and detachable from the printing apparatus.

Japanese Patent Laid-Open No. 2008-260199 discloses an inkjet print cartridge (also called a liquid ejection head) including a plurality of storage chambers (storage chambers) storing liquid and an inkjet printhead (an ejection unit) configured to perform printing by ejecting the liquid. Japanese Patent Laid-Open No. 2008-260199 also discloses that a plurality of supply channels (flow channels) for supplying the liquid from the storage chambers are configured between the respective storage chambers and the ejection unit and are each connected to the ejection unit.

However, with a liquid ejection head having a plurality of densely-disposed flow channels like the one in Japanese Patent Laid-Open No. 2008-260199, it is difficult to make the width of the main body of the liquid ejection head thin while reducing generation of air bubbles.

SUMMARY OF THE INVENTION

The present disclosure aims to provide a liquid ejection head in which air bubbles are generated less and which is thinner than ones in the prior art even in a case where a plurality of flow channels are disposed.

In an aspect of the present disclosure, there is provided a liquid ejection head comprising: a first ejection port array and a second ejection port array arranged side by side and each formed by a plurality of ejection ports for ejecting liquid arrayed in a first direction; a first filter configured to filter a liquid to be supplied to the first ejection port array; a second filter configured to filter a liquid to be supplied to the second ejection port array; a first flow channel configured to supply the liquid from the first filter to the first ejection port array; and a second flow channel configured to supply the liquid from the second filter to the second ejection port array, wherein the first flow channel includes a first downstream flow channel communicating with the first ejection port array and a first upstream flow channel communicating with the first filter and the first downstream flow channel, the second flow channel includes a second downstream flow channel communicating with the second ejection port array and a second upstream flow channel communicating with the second filter and the second downstream flow channel, in a state where the liquid ejection head is in use, the first upstream flow channel has a first region which is located above the first downstream flow channel in a vertical direction and which is where a sectional area of the first upstream flow channel becomes smaller and smaller from an upper side to a lower side in the vertical direction, and the second upstream flow channel has a second region which is located above the second downstream flow channel in the vertical direction and which is where a sectional area of the second upstream flow channel becomes smaller and smaller from an upper side to a lower side in the vertical direction, and in a view seen in the first direction, the first downstream flow channel and the second downstream flow channel do not overlap with each other, while the first region and the second region overlap with each other.

Further features of the present disclosure will become apparent from the following description of exemplary embodiments with reference to the attached drawings.

DESCRIPTION OF THE EMBODIMENTS

First Embodiment

The present embodiment is described below with reference to the drawings.

Figure 1:
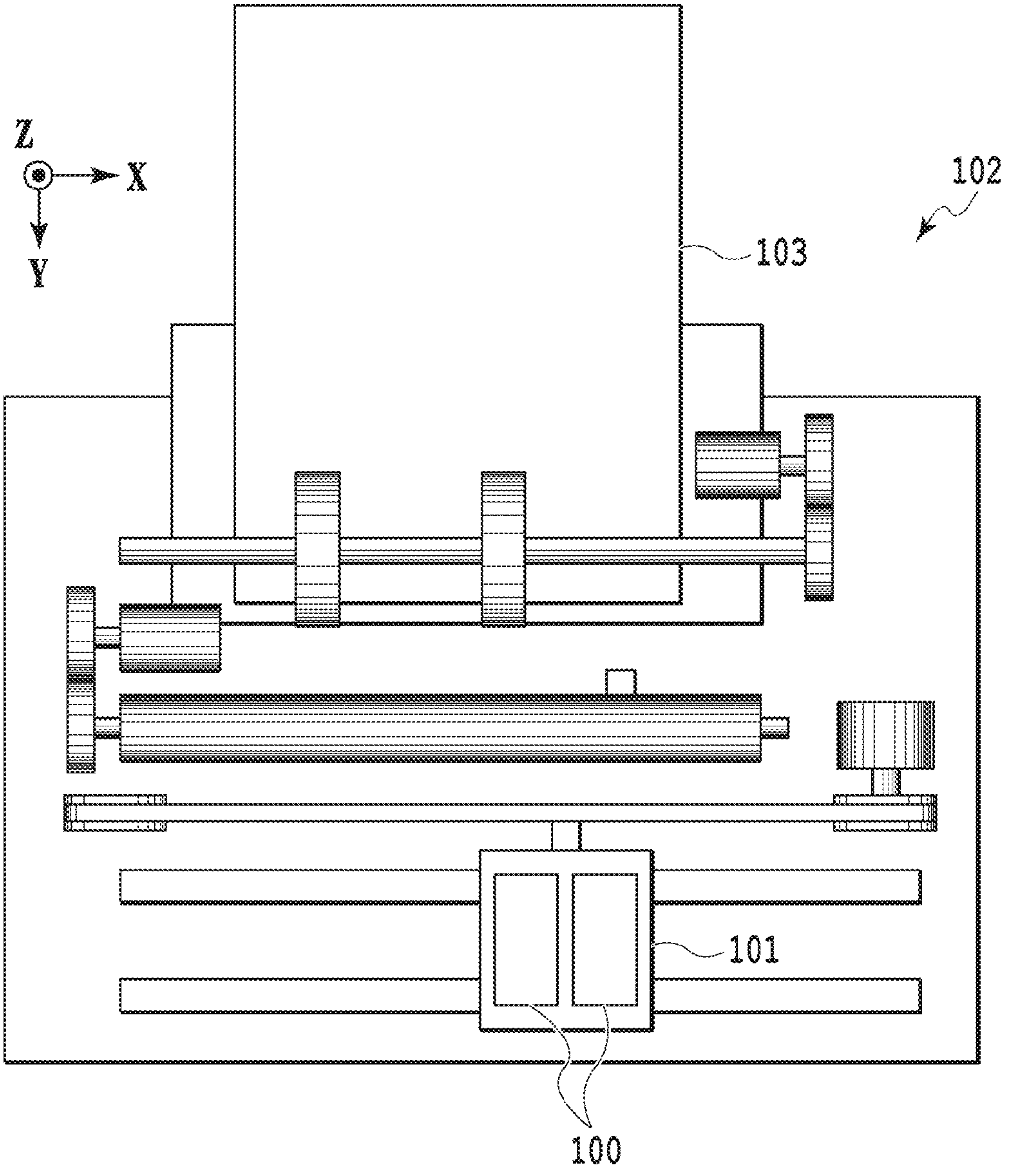
FIG. 1 is a schematic diagram showing an example of a printing apparatus of one embodiment.

FIG. 1 is a schematic diagram showing an inkjet printing apparatus (hereinafter also referred to simply as a printing apparatus) 102 to which the present embodiment can be applied.

In the drawings, the X-direction represents a carriage's scanning direction, the Y-direction represents a print medium's conveyance direction, and the Z-direction represents a vertically upward direction. Note that in the diagrams illustrating a cartridge solely (a liquid ejection head solely), the same X-, Y-, and Z-axes as those in FIG. 1 are shown based on a case where the cartridge (hereinafter also referred to as a liquid ejection head) is attached to the printing apparatus. Note that the direction along the longer side (the depth direction) of the cartridge in a state where the cartridge is attached to the printing apparatus is the Y-direction. The direction along the shorter side (the width direction) of the cartridge is the X-direction. The vertical direction (the height direction) of the cartridge is the Z-direction.

The printing apparatus 102 is configured such that a cartridge 100 can be mounted onto a carriage 101 and performs printing by causing the cartridge 100 mounted on the carriage 101 to eject liquid (hereinafter also referred to as ink) to a printing medium 103 while moving relative to the printing medium 103. In other words, the printing apparatus 102 is a printing apparatus including a serial-type liquid ejection head. In ejection, liquid is ejected from the cartridge 100 while the carriage 101 reciprocates in the X-direction. Timed with liquid ejection from the cartridge 100, the printing medium 103 is conveyed a predetermined amount at a time in a direction (the Y-direction) intersecting with (in the present example, orthogonal to) the direction in which the carriage 101 reciprocates, and an image is thereby formed on the printing medium 103.

Figure 2:
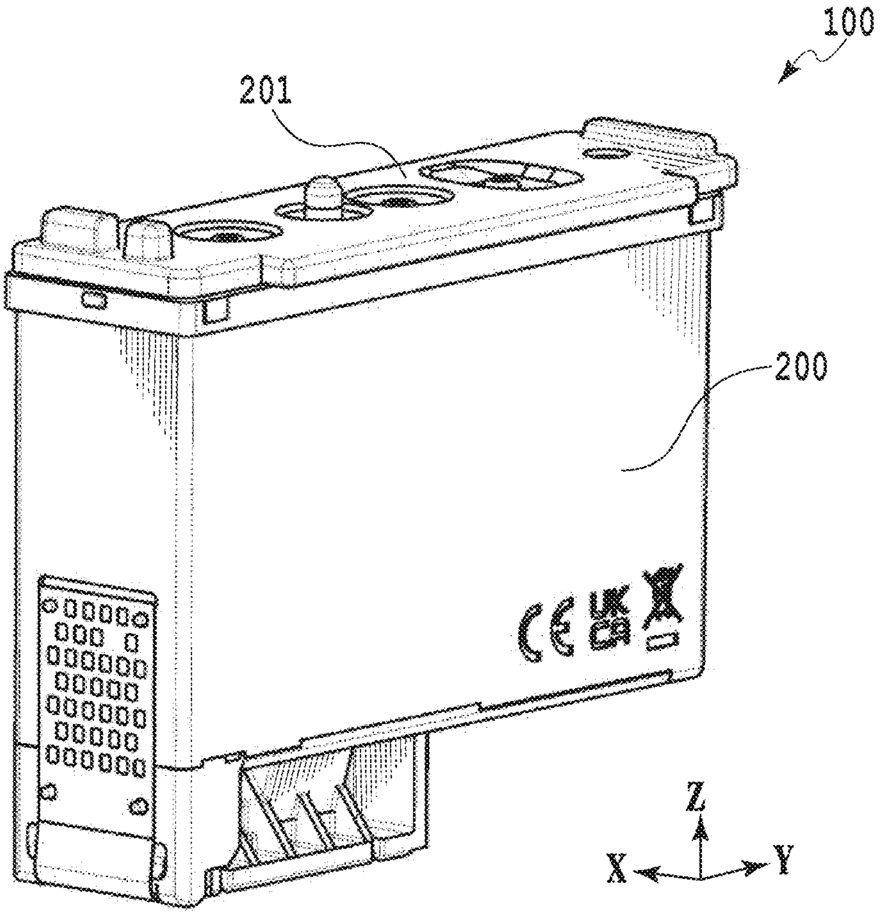
FIG. 2 is a perspective view showing an example of a cartridge of one embodiment.
Figure 3:
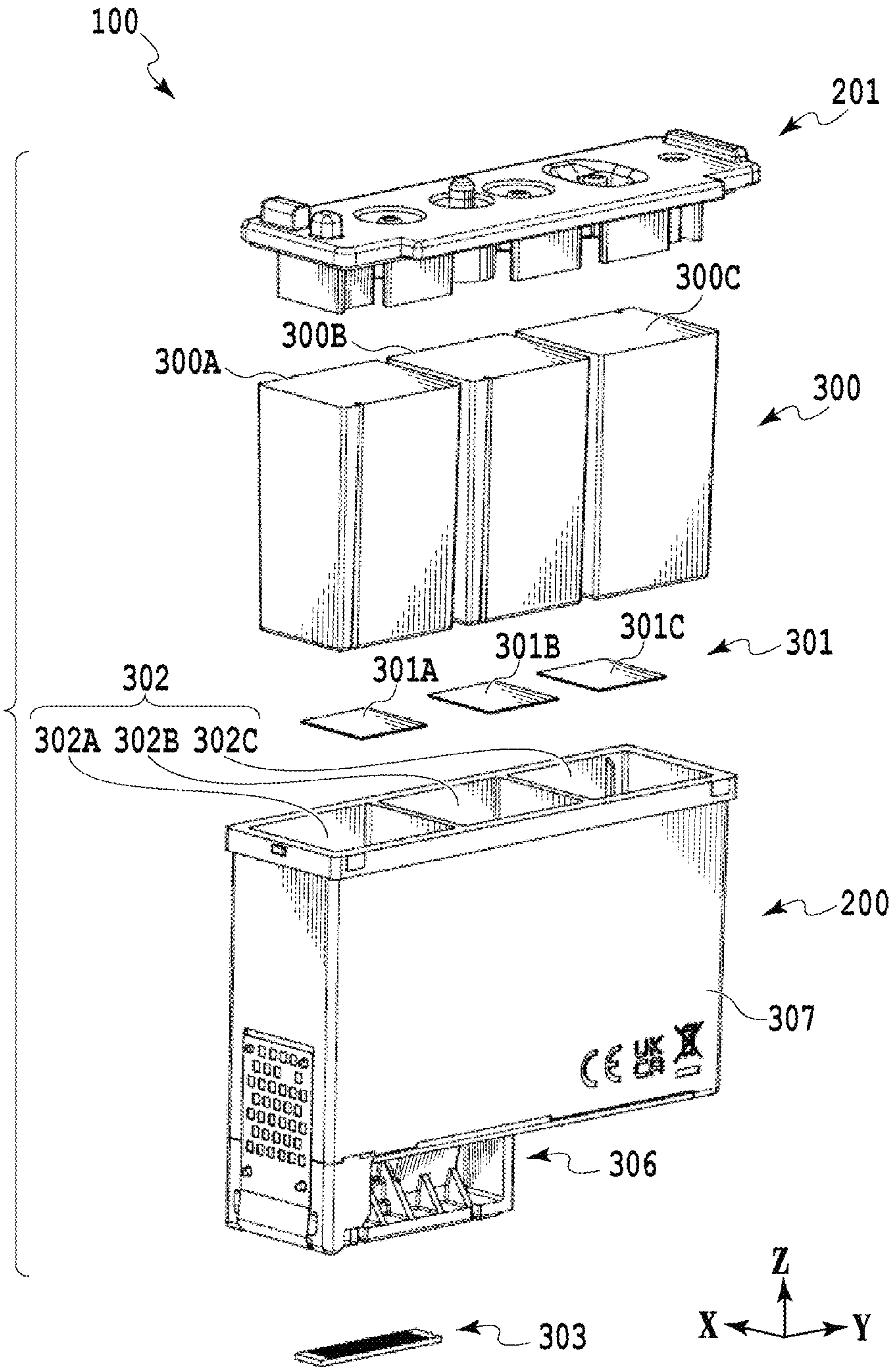
FIG. 3 is an exploded perspective view showing an example of a cartridge of one embodiment.

FIG. 2 is an external perspective view showing the cartridge 100, and FIG. 3 is an exploded perspective view of the cartridge 100. The cartridge 100 includes a printing element substrate 303 for ejecting liquid, a casing 200 in which storage chambers 302 for storing liquid are formed, and a lid 201. Each storage chamber 302 accommodates a filter 301 and an absorber 300 holding the liquid stored. Liquid held by the absorber 300 is supplied to ejection ports on the printing element substrate 303 via a flow channel unit (not shown in FIGS. 2 and 3) communicating with the storage chamber 302. Although the absorber 300 is inserted into the storage chamber 302 as a negative pressure generation unit for holding liquid in the present embodiment, liquid can be held similarly using a mode employing a negative pressure generation unit such as a pressure control unit or a circulation unit.

The storage chambers 302 of the present embodiment include a first storage chamber 302A capable of storing a liquid of a first type, a second storage chamber 302B capable of storing a liquid of a second type different from the first type, and a third storage chamber 302C capable of storing a liquid of a third type different from the first or second type. The first storage chamber 302A, the second storage chamber 302B, and the third storage chamber 302C are arranged adjacent to one another linearly in the depth direction (the Y-direction) of the cartridge 100.

A filter 301A, a filter 301B, and a filter 301C for trapping foreign matter are disposed in the first storage chamber 302A, the second storage chamber 302B, and the third storage chamber 302C, respectively. As will be described in detail later, in the present embodiment, a first ejection port array for ejecting the liquid of the first type, a second ejection port array for ejecting the liquid of the second type, and a third ejection port array for ejecting the liquid of the third type are formed. The filter 301A is configured to be able to filter the liquid to be supplied to the first ejection port array. The filter 301B is configured to be able to filter the liquid to be supplied to the second ejection port array. The filter 301C is configured to be able to filter the liquid to be supplied to the third ejection port array.

The liquids stored in the storage chambers 302 are typically color inks, and cyan, magenta, and yellow inks are stored in the respective storage chambers. Although the cartridge 100 has three storage chambers 302 in the example described in the present embodiment, the present disclosure is not limited to such a configuration, and the present embodiment can be applied to a mode with two or fewer or four or more storage chambers 302. For example, the same concept applies to an integral cartridge with four colors: black in addition to the above three color inks.

FIG. 3 shows the three absorbers 300A, 300B, 300C for cyan, magenta, and yellow. The absorber 300 is desirably close to a cuboid in shape in view of ease of liquid supply. Note that in a case of changing the size of the absorber 300 considering the capacity for storing liquid, it is preferable that the absorber 300 be extended in the direction of gravitational force (the Z-direction). Increasing the size of the absorbers 300 in the scanning direction (the X-direction) makes the cartridge 100 wider and thus leads to size increase of the apparatus as a whole. Also, increasing the size of the absorbers 300 in the direction in which the ejection ports are arrayed (the Y-direction) makes the flow channels extending from the absorbers 300 to the printing element substrate 303 longer, which increases flow resistance in the supply of liquid and is therefore not preferable.

The absorbers 300 are formed of fibrous bodies, porous bodies, or the like and can hold ink thereinside using the action of capillary force. The absorbers 300 are accommodated in the storage chambers 302 of the casing 200 while abutting with the filters 301, and the liquids in the absorbers 300 are supplied to the printing element substrate 303 via the filters 301 and the flow channel unit.

The printing element substrate 303 is an ejection unit configured to eject ink and is disposed on the bottom surface of the casing 200 located at a lower location in the direction of gravitational force. The printing element substrate 303 is disposed near the lower portions of the absorber 300A and the absorber 300B and is located away from the absorber 300C. The casing 200 has a box part 307 where the storage chambers 302 are formed and a flow channel formation part 306 protruding from the box part 307 in the −Z-direction, and the printing element substrate 303 is attached to the −Z-direction side of the flow channel formation part 306. Specifically, the printing element substrate 303 includes elements for applying energy needed for liquid ejection to the liquid (such as, for example, heaters or piezoelectric elements). The printing element substrate 303 is attached to a printing element disposing portion formed in a member forming the flow channel formation part 306. Specifically, the printing element substrate 303 is disposed at the bottom surface of the cartridge 100 as a whole and is close to the printing medium 103 at the time of ejecting liquid.

The lid 201 is disposed to close the opening of the casing 200 and partitions the storage chambers 302 where the absorbers 300 are accommodated. The lid 201 has an atmosphere communication port (not shown) so that air can be taken in from the outside for the amount of liquid in the absorbers 300 consumed by ejection.

Figure 4:
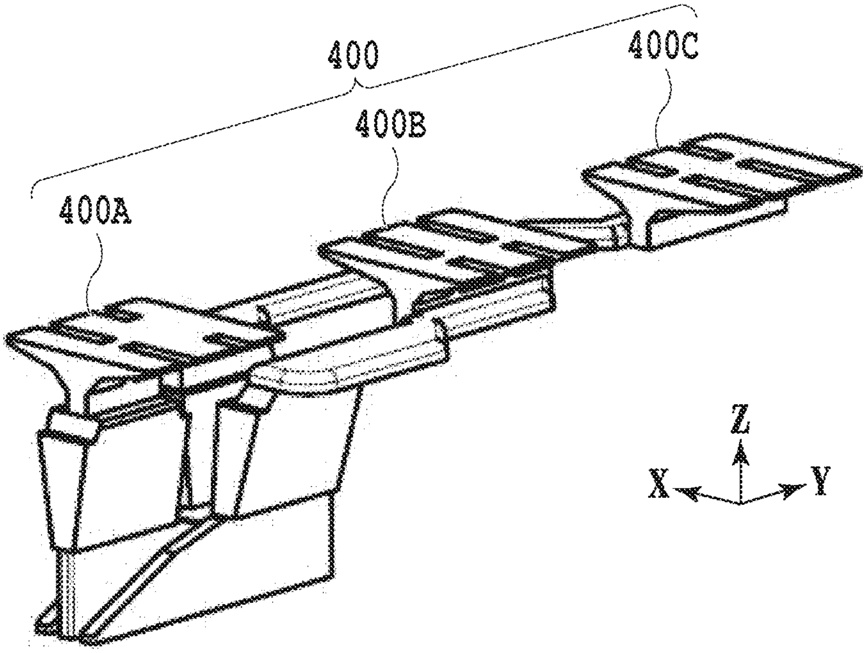
FIG. 4 is a perspective view showing an example of a flow channel unit of one embodiment.
Figure 5A:
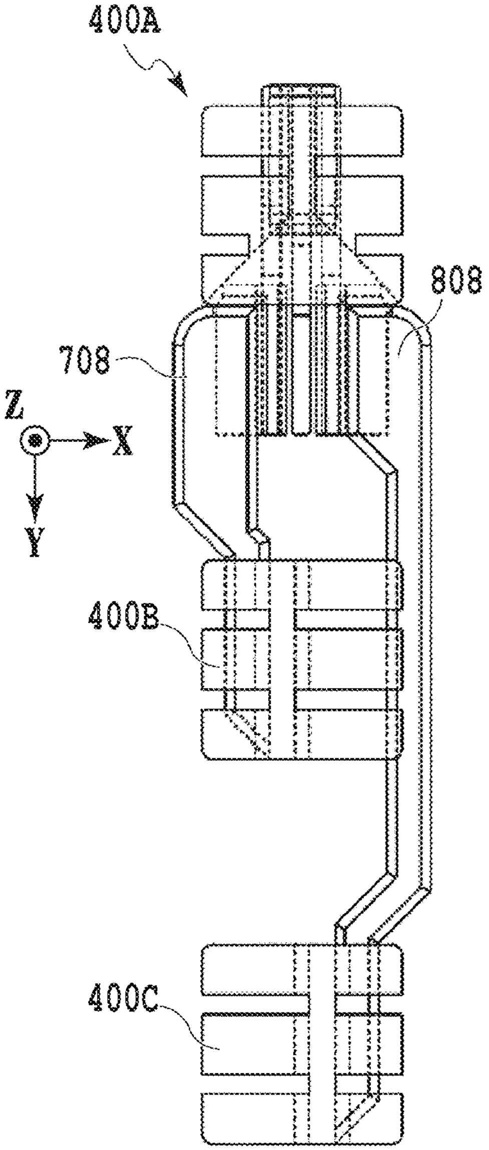
FIG. 5A is a top view of the flow channel unit of one embodiment.
Figure 5B:
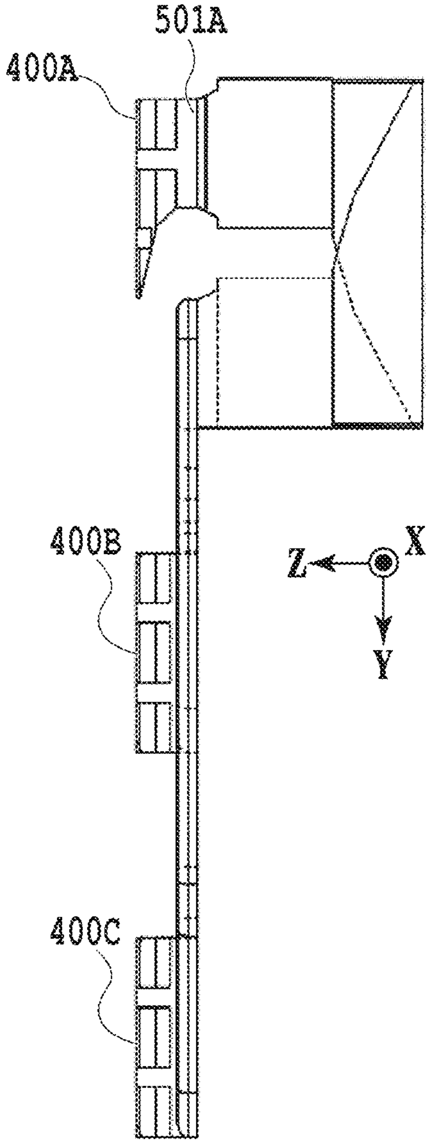
FIG. 5B is a side view of the flow channel unit of one embodiment.
Figure 5C:
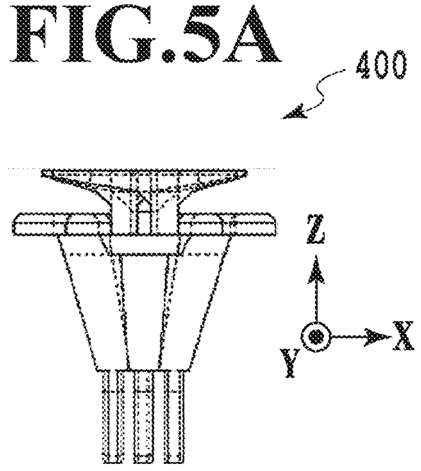
FIG. 5C is a front view of the flow channel unit of one embodiment.

FIG. 4 is a perspective view of a flow channel unit 400, which is a model of a liquid flow channel space extracted from the casing. FIG. 5A is a top view of the flow channel unit 400, FIG. 5B is a side view of the flow channel unit 400, and FIG. 5C is a front view of the flow channel unit 400. Note that a horizontal portion 708 and a horizontal portion 808 shown in FIG. 5A will be described later. The flow channel unit 400 is a model of an extraction of ink flow channels and includes flow channels for three colors (400A, 400B, 400C). The flow channels are independent of each other and specifically arranged in the Y-direction in the order of the flow channel 400A, the flow channel 400B, and the flow channel 400C, as shown in FIG. 5A. In this way, the flow channel unit 400 is configured to be able to supply the liquids in the storage chambers 302 (see FIG. 3) to the printing element substrate 303 (see FIG. 3).

As shown in FIGS. 4 and 5B, in a view of the cartridge seen along the depth direction, tapered portions formed at the respective connection flow channels arranged in the cartridge's width direction face opposite directions alternately. In the flow channel unit 400, tip end portions of the respective connection flow channels adjacent to each other in the cartridge's width direction are disposed facing opposite directions alternately in the cartridge depth direction (the tip end portion is a portion with the smallest height (length in the Z-direction)). Note that the connection flow channels and the tapered portions of the flow channel unit 400 will be described later.

Figure 6A:
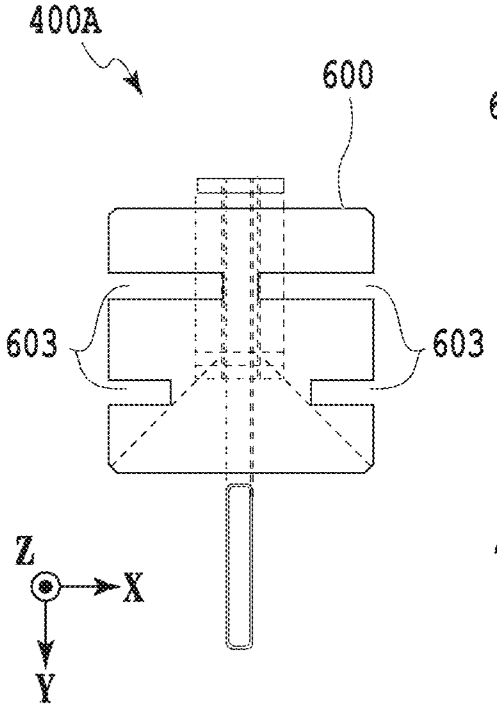
FIG. 6A is a top view of a flow channel of one embodiment.
Figure 6B:
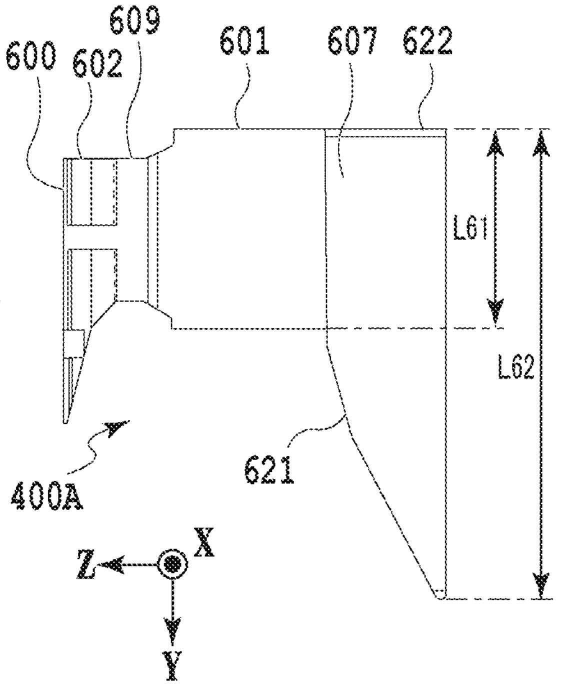
FIG. 6B is a side view of the flow channel of one embodiment.
Figure 7A:
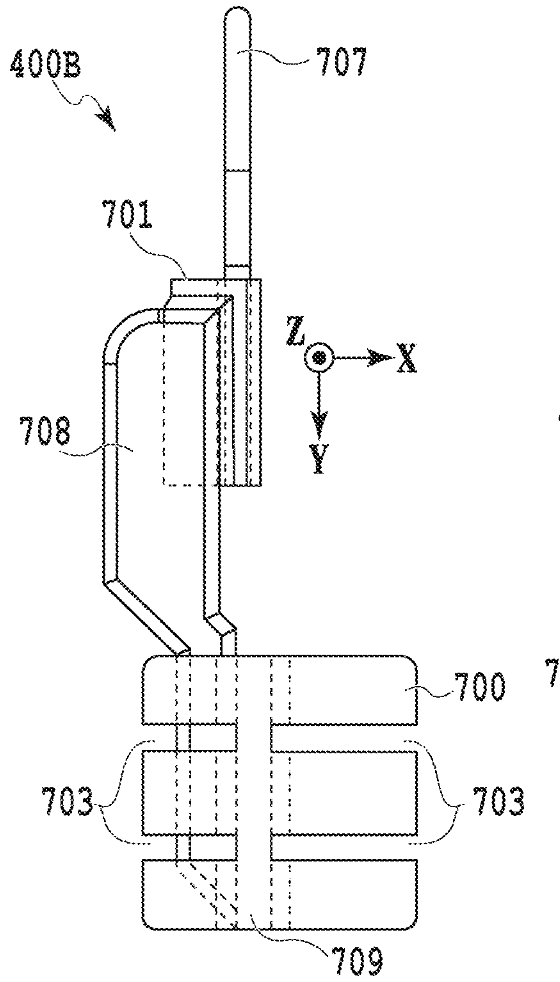
FIG. 7A is a top view of a flow channel of one embodiment.
Figure 7B:
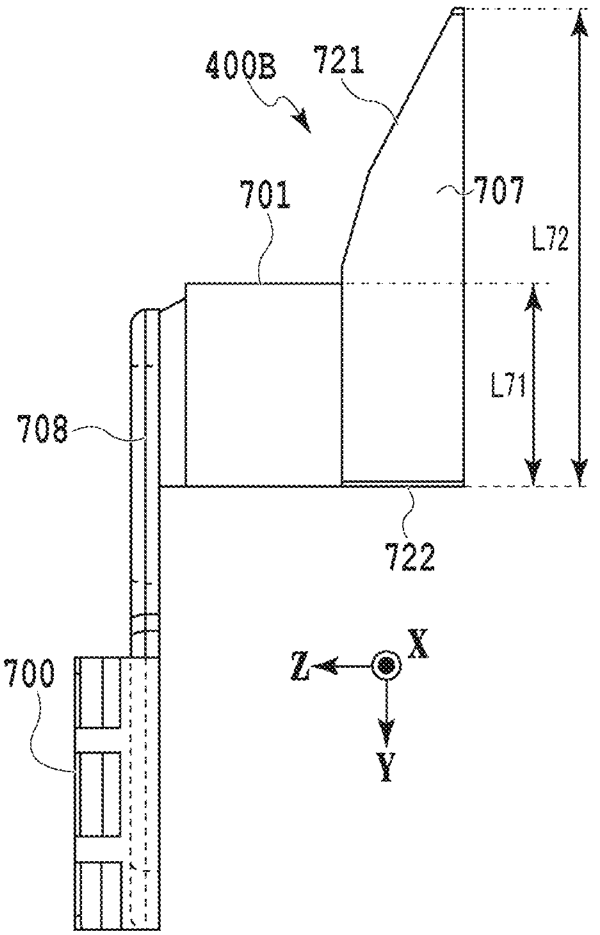
FIG. 7B is a side view of the flow channel of one embodiment.
Figure 7C:
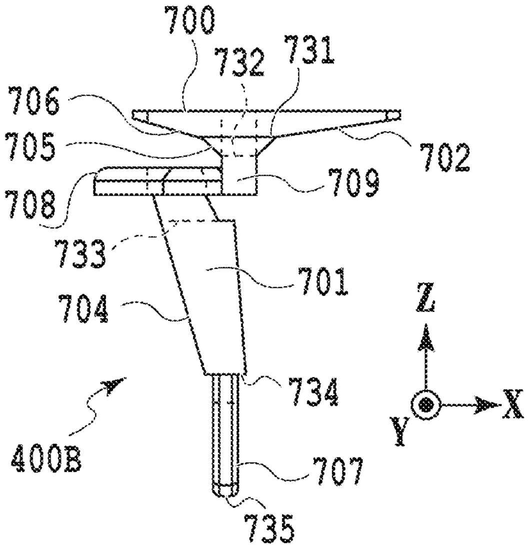
FIG. 7C is a front view of the flow channel of one embodiment.
Figure 8A:
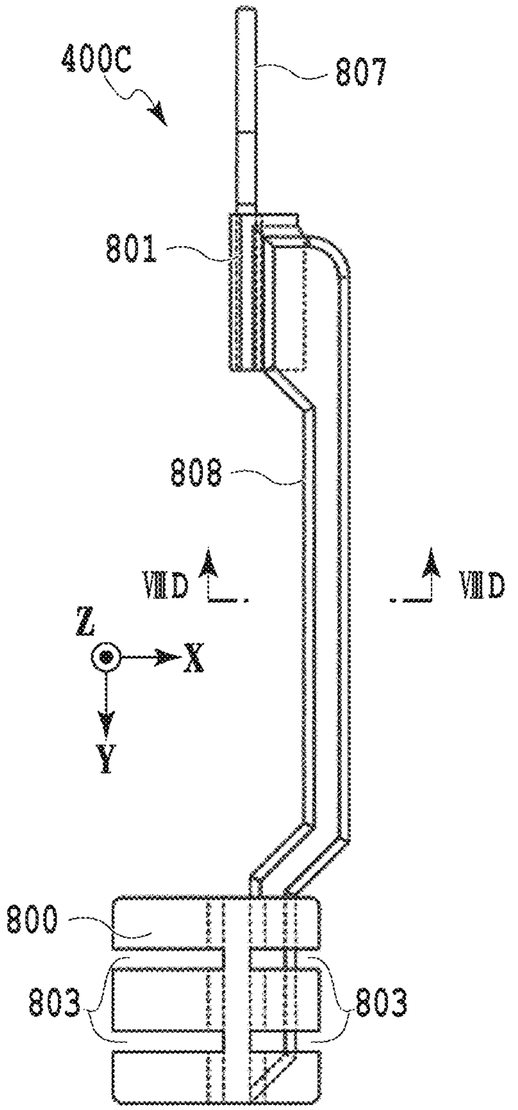
FIG. 8A is a top view of a flow channel of one embodiment.
Figure 8B:
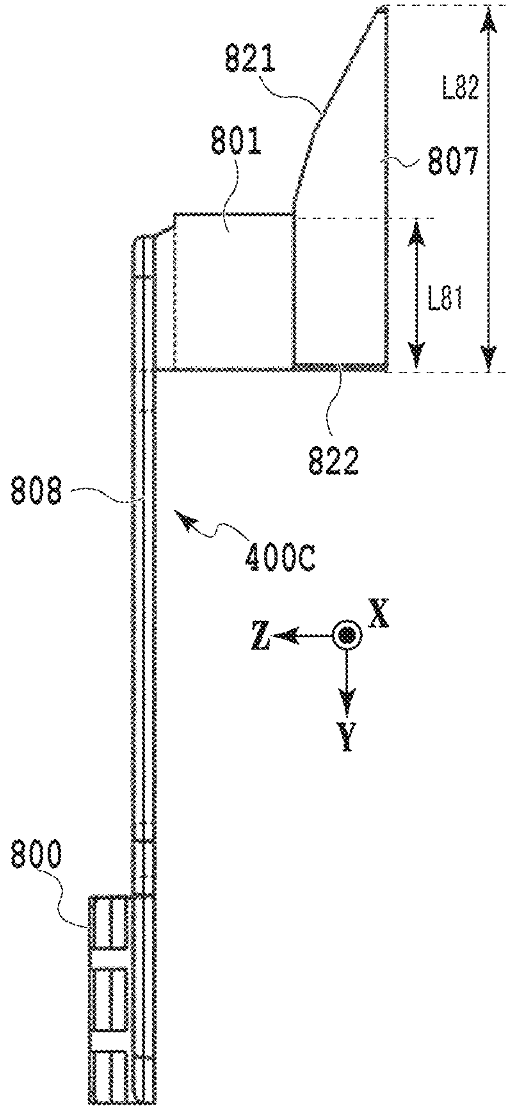
FIG. 8B is a side view of the flow channel of one embodiment.
Figure 8C:
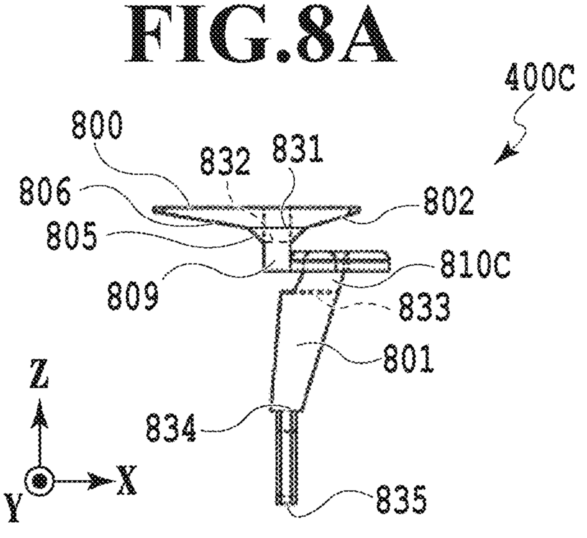
FIG. 8C is a front view of the flow channel of one embodiment.
Figure 8D:
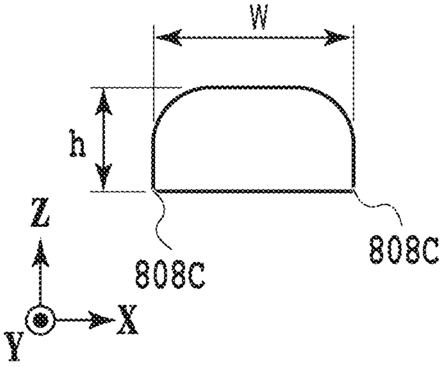
FIG. 8D is a sectional view of the flow channel of one embodiment.

FIG. 6A is a top view of the flow channel 400A, FIG. 6B is a side view of the flow channel 400A, and FIG. 6A is a front view of the flow channel 400A. FIG. 7A is a top view of the flow channel 400B, FIG. 7B is a side view of the flow channel 400B, and FIG. 7C is a front view of the flow channel 400B. FIG. 8A is a top view of the flow channel 400C, FIG. 8B is a side view of the flow channel 400C, FIG. 8C is a front view of the flow channel 400C, and FIG. 8D is a sectional view taken along the line VIIID-VIIID in FIG. 8A.

Figure 6C:
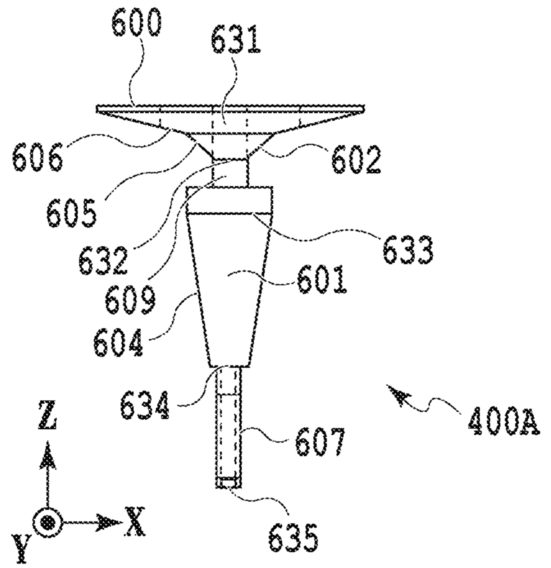
FIG. 6C is a front view of the flow channel of one embodiment.

As shown in FIGS. 6A to 6C, the flow channel 400A includes a first opening portion 600 covered by the filter 301A (see FIG. 3) and a first retention portion 601. The flow channel 400A includes a second retention portion 602, a second opening portion 609 linking the first retention portion 601 and the second retention portion 602 to each other, and a connection flow channel 607 connected to the printing element substrate 303 (see FIG. 3). In a state where the liquid ejection head (the cartridge) is in use, the second opening portion 609 communicating with the second retention portion 602 is formed at the uppermost surface of the first retention portion 601.

In the present embodiment, a space in which air bubbles can be retained and which has a larger width than the connection portion (e.g., the connection flow channel 607, 707, or 807) as the cartridge is seen along an extending direction in which the horizontal portions (to be described later) extend is called a "retention portion." For example, the first retention portion 601 and the second retention portion 602 are wider than other regions and allow air bubbles generated as a result of ejection or the like to be retained above the liquid surface.

In a state where the cartridge is attached to the printing apparatus, the first retention portion 601 has a tapered portion 604 whose opening 633 at a vertically upper end is larger than its opening 634 at a vertically lower end. In a state where the cartridge is attached to the printing apparatus, the second retention portion 602 is disposed extending vertically.

In a state where the cartridge is attached to the printing apparatus, the second retention portion 602 has a tapered portion (a first tapered portion 605 and a second tapered portion 606) such that the first opening portion 600 at a vertically upper end is larger than the second opening portion 609 at a vertically lower end. The first retention portion 601 is disposed between the connection flow channel 607 and the second retention portion 602. The second retention portion 602 is disposed between the first retention portion 601 and the first storage chamber 302A (see FIG. 3).

The first opening portion 600 is an opening for receiving liquid that has passed through the filter 301A and is located at the bottom surface of the storage chamber 302 (see FIG. 3) accommodating the absorber 300A. The first retention portion 601 and the second retention portion 602 are configured to have space that becomes larger and larger upwards in the vertical direction. Specifically, the first retention portion 601 is provided with the tapered portion 604 to have space that becomes larger and larger upwards in the vertical direction, and the second retention portion 602 is provided with the first tapered portion 605 and the second tapered portion 606. This configuration enables air bubbles generated inside the flow channel to be collected using their buoyancy so that they will not near the ejection portions.

In the present embodiment, the second retention portion 602 is provided with a plurality of partitioning walls 603. The plurality of partitioning walls 603 partition the inside of the second retention portion 602 into a plurality of spaces that are joined to each other. Adjacent two partitioning walls 603 are desirably disposed away from each other by 1 mm or more. It is also desirable that the inside of the second retention portion 602 be partitioned into two or more spaces. The more spaces formed in the inside of the second retention portion 602, the better.

Partitioning the inside of the second retention portion 602 into a plurality of spaces helps prevent air bubbles from moving to a different partitioned space. Because the inside of the second retention portion 602 is partitioned into a plurality of spaces, should one of the spaces be clogged for some reason, a flow channel is secured by the other spaces. This consequently helps prevent liquid supply failure in the event of downstream (vertically downward) liquid supply.

Two tapered portions, namely the first tapered portion 605 and the second tapered portion 606, are formed at the second retention portion 602 so that air bubbles may move toward the filter in a narrow space. The angle of the first tapered portion 605 relative to the horizontal direction (the X-direction) is preferably not smaller than 10 degrees and not greater than 80 degrees, more preferably not smaller than 20 degrees and not greater than 60 degrees, or even more preferably not smaller than 30 degrees and not greater than 50 degrees so that air bubbles can move upward without a meniscus formed. Also, in the second retention portion 602, the distance from the space in the second retention portion 602 to the filter 301A needs to be shortened to increase the flow rate of ink flowing in the event of a restoration operation such as suction. For this reason, the angle of the second tapered portion 606 relative to the horizontal direction is preferably not greater than 45 degrees, more preferably not greater than 30 degrees, or even more preferably not greater than 20 degrees.

The first retention portion 601 is connected to the connection flow channel 607, and an opening 635 formed at the lower end of the connection flow channel 607 is connected to the ejection port array at the printing element substrate 303 (see FIG. 3).

In the present embodiment, the second retention portion 602 includes an opening 631 located at an upper end portion of the first tapered portion 605 and an opening 632 located at a lower end portion of the first tapered portion 605. The area of the opening 631 is larger than the area of the opening 632. For example, it is preferable that the area of the opening 631 be 1.5 times or more larger than the area of the opening 632 in order for generated air bubbles to be retained and not to flow into the ejection port array.

The first retention portion 601 includes an opening 633 located at an upper end portion of the first retention portion 601 and an opening 634 located at a lower end portion of the first retention portion 601. The area of the opening 633 is larger than the area of the opening 634. For example, it is preferable that the area of the opening 633 be 1.2 times or more larger than the area of the opening 634 in order for generated air bubbles to be retained and not to flow into the ejection port array.

A third tapered portion 621 and a wall surface 622 are formed at the connection flow channel 607 in order to make it easy for air bubbles in the liquid in the connection flow channel 607 to be discharged from the opening 635 in the event of a restoration operation. The wall surface 622 extends from an end of the base of the connection flow channel 607 perpendicularly to the base and is connected to the first retention portion 601.

The third tapered portion 621 is formed at the connection flow channel 607 such that the length "L61" of the connection flow channel 607 in the depth direction (the Y-direction) at a portion connected to the first retention portion 601 is smaller than the length "L62" of the connection flow channel 607 in the depth direction (the Y-direction) at a portion connected to the printing element substrate 303. The opening 634 is formed (directly) below the second opening portion 609 vertically. This makes it easier for air bubbles to move upward vertically. In order for air bubbles to move upward vertically in a narrow space, it is preferable that two stages of slanted surfaces with different angles relative to the opening 635 be formed at the third tapered portion 621.

In the present embodiment, the third tapered portion 621 includes a first slanted portion and a second slanted portion. The first slanted portion is formed extending from one end portion, in the depth direction, of the connection flow channel 607 toward the first retention portion 601 and is slanted relative to the opening 635 at a first angle. The second slanted portion is formed extending from an end portion of the first slanted portion toward the first retention portion 601, the end portion being opposite from the one end portion of the connection flow channel 607 in the depth direction. The second slanted portion is slanted relative to the opening 635 at a second angle which is smaller than the first angle.

The first retention portion 601 is preferably formed to be as large as possible in order to be able to retain more air bubbles. Thus, the first retention portion 601 is formed to become larger and larger from the opening 634 to the opening 633. In addition, the relation between the length "L61" in the depth direction (the Y-direction) at the second opening portion 609 and the length "L62" in the depth direction (the Y-direction) at the opening 635 can be expressed as follows:

$$L62 > L61 \times 2. \quad \text{(Formula 1)}$$

Specifically, the length "L62" in the depth direction at the opening 635 connecting the connection flow channel 607 to the printing element substrate is more than twice as long as the length "L61" in the depth direction at the opening 634 connecting the connection flow channel 607 to the first retention portion 601.

As shown in FIGS. 7A to 7C, the flow channel 400B includes a first opening portion 700 where the filter 301B is provided, a first retention portion 701, a second retention portion 702, a second opening portion 709 linking the first retention portion 701 and the second retention portion 702 to each other, and a connection flow channel 707. The first retention portion 701 having a tapered portion 704 is disposed at a lower position than the horizontal portion 708.

The second retention portion 702 is provided with a plurality of partitioning walls 703. The plurality of partitioning walls 703 partition the inside of the second retention portion 702 into a plurality of spaces that are joined to each other. Adjacent two partitioning walls 703 are desirably disposed away from each other by 1 mm or more. It is also desirable that the inside of the second retention portion 702 be partitioned into two or more spaces. The more spaces formed in the inside of the second retention portion 702, the better.

Partitioning the inside of the second retention portion 702 into a plurality of spaces helps prevent air bubbles from moving to a different partitioned space. Because the inside of the second retention portion 702 is partitioned into a plurality of spaces, should one of the spaces be clogged for some reason, a flow channel is secured by the other spaces. This consequently helps prevent liquid supply failure in the event of downstream (vertically downward) liquid supply.

The first opening portion 700 is an opening for receiving liquid that has passed through the filter 301B (see FIG. 3) and is located at the bottom surface of the storage chamber 302 (see FIG. 3) accommodating the absorber 300B. The first retention portion 701 provided near the nozzle array and the second retention portion 702 provided near the storage chamber are connected to each other via the second opening portion 709 and the horizontal portion 708 which extends in the Y-direction. Also, the first retention portion 701 and the second retention portion 702 are configured to have space that becomes larger and larger upwards in the vertical direction. The first retention portion 701 is provided with the tapered portion 704 to have space that becomes larger and larger upwards in the vertical direction, and the second retention portion 702 is provided with a first tapered portion 705 and a second tapered portion 706. This configuration enables air bubbles generated inside the flow channel to be collected using their buoyancy so that they will not near the ejection portions.

In order for air bubbles to move towards the filter in a narrow space, it is preferable that two stages of tapered portions, namely, the first tapered portion 705 and the second tapered portion 706, be formed at the second retention portion 702. The angle of the first tapered portion 705 relative to the horizontal direction (the X-direction) is preferably not smaller than 10 degrees and not greater than 80 degrees, more preferably not smaller than 20 degrees and not greater than 60 degrees, or even more preferably not smaller than 30 degrees and not greater than 50 degrees so that air bubbles can move upward without a meniscus formed. Also, in the second retention portion 702, the distance from the space in the second retention portion 702 to the filter 301B needs to be shortened to increase the flow rate of ink flowing in the event of a restoration operation such as suction. For this reason, the angle of the second tapered portion 706 relative to the horizontal direction is preferably not greater than 45 degrees, more preferably not greater than 30 degrees, or even more preferably not greater than 20 degrees.

The first retention portion 701 is connected to the connection flow channel 707, and an opening 735 formed at the lower end of the connection flow channel 707 is connected to the ejection port array at the printing element substrate 303.

The second retention portion 702 includes an opening 731 located at an upper end portion of the first tapered portion 705 and an opening 732 located at a lower end portion of the first tapered portion 705. The area of the opening 731 is larger than the area of the opening 732. For example, it is preferable that the area of the opening 731 be 1.5 times or more larger than the area of the opening 732 in order for generated air bubbles to be retained and not to flow into the ejection port array.

The first retention portion 701 includes an opening 733 located at an upper end portion of the first retention portion 701 and an opening 734 located at a lower end portion of the first retention portion 701. The area of the opening 733 is larger than the area of the opening 734. For example, it is preferable that the area of the opening 733 be 1.2 times or more larger than the area of the opening 734 in order for generated air bubbles to be retained and not to flow into the ejection port array.

A third tapered portion 721 and a wall surface 722 are formed at the connection flow channel 707 in order to make it easy for air bubbles in the liquid in the connection flow channel 707 to be discharged from the opening 735 in the event of a restoration operation. The wall surface 722 extends from an end of the base of the connection flow channel 707 perpendicularly to the base and is connected to the first retention portion 701.

The third tapered portion 721 is formed at the connection flow channel 707 such that the length "L71" of the connection flow channel 707 in the depth direction (the Y-direction) at a portion connected to the first retention portion 701 is smaller than the length "L72" of the connection flow channel 707 in the depth direction (the Y-direction) at a portion connected to the printing element substrate 303. A plurality of the openings 734 are arranged in the Y-direction at positions closer to the opening 733. It is preferable that two stages of slanted surfaces with different angles relative to the opening 735 be formed at the third tapered portion 721.

In the present embodiment, the third tapered portion 721 includes a first slanted portion and a second slanted portion. The first slanted portion is slanted relative to the opening 735 at a first angle. The second slanted portion is slanted relative to the opening 735 at a second angle which is smaller than the first angle.

The first retention portion 701 is preferably formed to be as large as possible in order to be able to retain more air bubbles. Thus, the first retention portion 701 is formed to become larger and larger from the openings 734 to the opening 733. In addition, the relation between the length "L71" in the depth direction (the Y-direction) at the second opening portion 709 and the length "L72" in the depth direction (the Y-direction) at the opening 735 can be expressed as follows:

$$L72 > L71 \times 2. \qquad \text{(Formula 2)}$$

Specifically, the length "L72" in the depth direction at the opening 735 connecting the connection flow channel 707 to the printing element substrate is more than twice as long as the length "L71" in the depth direction at the openings 734 connecting the connection flow channel 707 to the first retention portion 701.

As shown in FIGS. 8A to 8D, the flow channel 400C has a first opening portion 800 where the filter 301C (see FIG. 3) is provided, a first retention portion 801, a second retention portion 802, and a second opening portion 809 linking the first retention portion 801 and the second retention portion 802 to each other, and a connection flow channel 807.

The second retention portion 802 is provided with a plurality of partitioning walls 803. The plurality of partitioning walls 803 partition the inside of the second retention portion 802 into a plurality of spaces that are joined to each other. Adjacent two partitioning walls 803 are desirably disposed away from each other by 1 mm or more. It is also desirable that the inside of the second retention portion 802 be partitioned into two or more spaces. The more spaces formed in the inside of the second retention portion 802, the better.

Partitioning the inside of the second retention portion 802 into a plurality of spaces helps prevent air bubbles from moving to a different partitioned space. Because the inside of the second retention portion 802 is partitioned into a plurality of spaces, should one of the spaces be clogged for some reason, a flow channel is secured by the other spaces. This consequently helps prevent liquid supply failure in the event of downstream (vertically downward) liquid supply.

The first opening portion 800 is an opening for receiving liquid that has passed through the filter 301C and is located at the bottom surface of the storage chamber 302 accommodating the absorber 300C. The first retention portion 801 provided near the nozzle array and the second retention portion 802 provided near the storage chamber are connected to each other via the second opening portion 809 and the horizontal portion 808 which extends in the Y-direction. Also, the first retention portion 801 and the second retention portion 802 are configured to have space that becomes larger and larger upwards in the vertical direction. The first retention portion 801 is provided with a tapered portion 804 to have space that becomes larger and larger upwards in the vertical direction, and the second retention portion 802 is provided with a first tapered portion 805 and a second tapered portion 806. This configuration enables air bubbles generated inside the flow channel to be collected using their buoyancy so that they will not near the ejection portions.

In order for air bubbles to move towards the filter in a narrow space, it is preferable that two stages of tapered portions, namely the first tapered portion 805 and the second tapered portion 806, be formed at the second retention portion 802. The angle of the first tapered portion 805 relative to the horizontal direction is preferably not smaller than 10 degrees and not greater than 80 degrees, more preferably not smaller than 20 degrees and not greater than 60 degrees, or even more preferably not smaller than 30 degrees and not greater than 50 degrees so that air bubbles can move upward without a meniscus formed. Also, in the second retention portion 802, the distance from the space in the second retention portion 802 to the filter 301C needs to be shortened to increase the flow rate of ink flowing in the event of a restoration operation such as suction. For this reason, the angle of the second tapered portion 806 relative to the horizontal direction is desirably not greater than 45 degrees, more desirably not greater than 30 degrees, or even more desirably not greater than 20 degrees.

The horizontal portion 808 is provided at a lower position than the second opening portion 809. The first retention portion 801 having the tapered portion 804 is disposed at a lower position than the horizontal portion 808. The horizontal portion 808 extends in the depth direction (the Y-direction) of the cartridge. A tip end portion of the horizontal portion 808 is connected to a third opening portion 810C. The third opening portion 810C is connected to the ejection port array at the printing element substrate via the first retention portion 801 and the connection flow channel 807. The configuration where such a horizontal portion 808 is provided improves the flexibility of layout in the storage chamber 302 compared to the prior art.

The second retention portion 802 includes an opening 831 located at an upper end portion of the first tapered portion 805 and an opening 832 located at a lower end portion of the first tapered portion 805. The area of the opening 831 is larger than the area of the opening 832. For example, it is preferable that the area of the opening 831 be 1.5 times or more larger than the area of the opening 832 in order for generated air bubbles to be retained and not to flow into the ejection port array.

The first retention portion 801 includes an opening 833 located at an upper end portion of the first retention portion 801 and an opening 834 located at a lower end portion of the first retention portion 801. The area of the opening 833 is larger than the area of the opening 834. For example, it is preferable that the area of the opening 833 be 1.2 times or more larger than the area of the opening 834 in order for generated air bubbles to be retained and not to flow into the ejection port array.

A third tapered portion 821 and a wall surface 822 are formed at the connection flow channel 807 in order to make it easy for air bubbles in liquid in the connection flow channel 807 to be discharged from an opening 835 in the event of a restoration operation. The wall surface 822 extends from an end of the base of the connection flow channel 807 perpendicularly to the base and connected to the first retention portion 801.

The third tapered portion 821 is formed at the connection flow channel 807 such that the length "L81" of the connection flow channel 807 in the depth direction (the Y-direction) at a portion connected to the first retention portion 801 is smaller than the length "L82" of the connection flow channel 807 in the depth direction (the Y-direction) at a portion connected to the printing element substrate 303. A plurality of the openings 834 are disposed in the Y-direction at positions closer to the opening 833. It is preferable that two stages of slanted surfaces with different angles relative to the opening 835 be formed at the third tapered portion 821 in order to move air bubbles upwards in the vertical direction in a narrow space.

In the present embodiment, the third tapered portion 821 includes a first slanted portion and a second slanted portion. The first slanted portion is slanted relative to the opening 835 at a first angle. The second slanted portion is slanted relative to the opening 835 at a second angle which is smaller than the first angle.

The first retention portion 801 is preferably formed to be as large as possible in order to be able to retain more air bubbles. Thus, the first retention portion 801 is formed to become larger and larger from the openings 834 to the opening 833. In addition, the relation between the length "L81" in the depth direction (the Y-direction) at the second opening portion 809 and the length "L82" in the depth direction (the Y-direction) at the opening 835 can be expressed as follows:

$$L82 > L81 \times 2. \quad \text{(Formula 3)}$$

Specifically, the length "L82" in the depth direction at the opening 835 connecting the connection flow channel 807 to the printing element substrate is more than twice as long as the length "L81" in the depth direction at the openings 834 connecting the connection flow channel 807 to the first retention portion 801.

The first retention portion 801 is connected to the connection flow channel 807, and the connection flow channel 807 is connected to the ejection port array at the printing element substrate 303.

As shown in FIG. 8D, corner portions 808*c* are provided at the bottom portion of the horizontal portion 808. Due to capillary force at the corner portions 808*c*, in a case where air bubbles are generated, the air bubbles can be trapped at the corner portions 808*c*, and liquid can be supplied to the third opening portion 810C. Air bubbles have the tendency to accumulate at an upper part of a flow channel. Due to this tendency, the corner portions 808*c* are desirably located low vertically. At least one corner portion 808*c* suffices as long as air bubbles can be trapped. However, the more the corner portions 808*c*, the better. The width "w" of the horizontal portion 808 is larger than the height "h" of the horizontal portion 808. This enables both reducing the overall height of the cartridge and securing fluidity of liquid upon generation of air bubbles. In other words, because the width "w" of the horizontal portion 808 is larger than the height "h" thereof, ease of liquid supply to the printing element substrate can be ensured. For example, the ratio of the height "h" of the horizontal portion 808 to the width "w" of the horizontal portion 808 is desirably 1 to not smaller than 1.5.

Figure 9A:
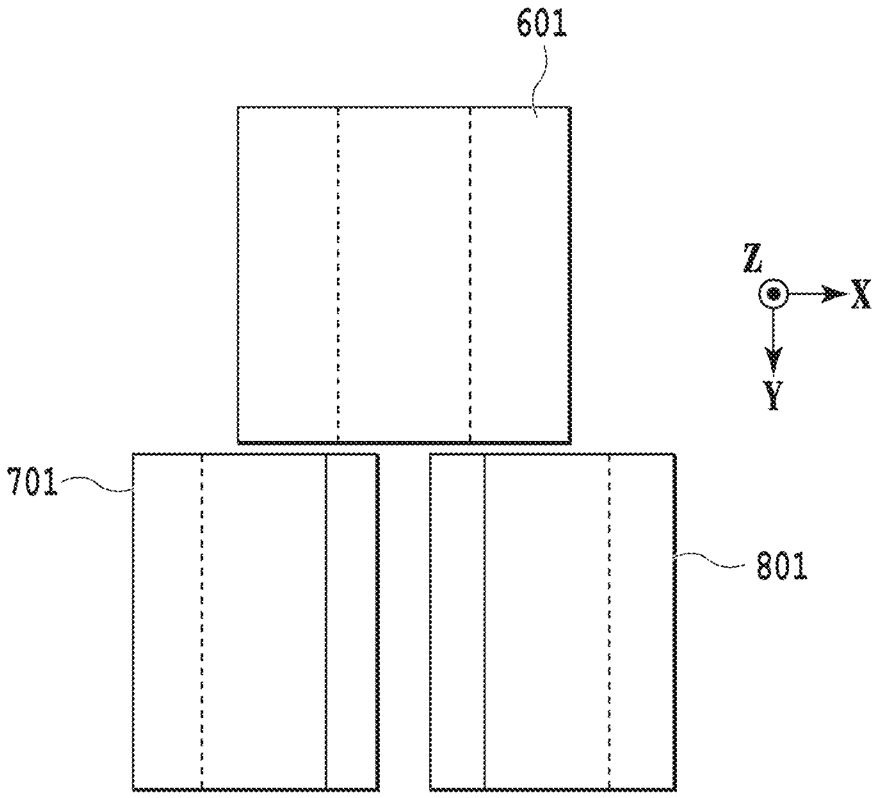
FIG. 9A is a schematic top view of a first retention portion.
Figure 9B:
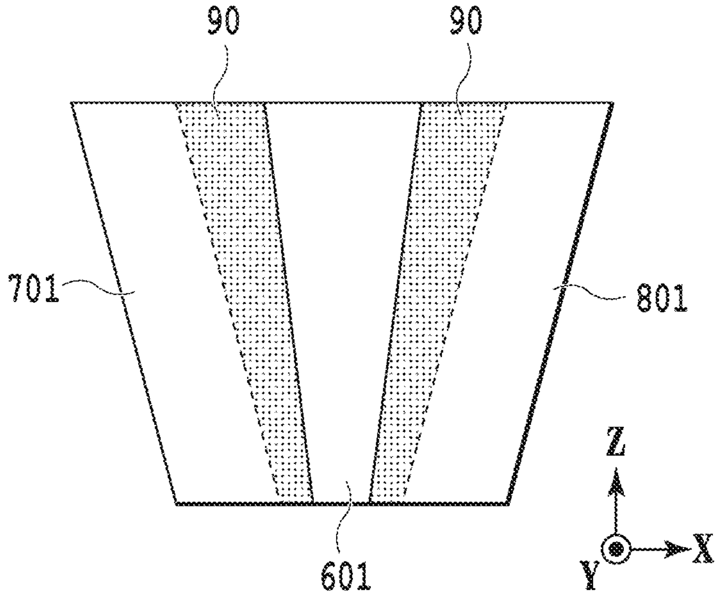
FIG. 9B is a schematic front view of the first retention portion.

FIG. 9A is a schematic top view of the first retention portion 601, the first retention portion 701, and the first retention portion 801. FIG. 9B is a schematic front view of the first retention portion 601, the first retention portion 701, and the first retention portion 801.

As shown in FIG. 9A, the first retention portion 701 and the first retention portion 801 adjacent in the cartridge width direction (the X-direction) are disposed at positions not overlapping with the first retention portion 601 in the depth direction (the Y-direction). In other words, the first retention portion 701 and the first retention portion 801 are disposed at positions not overlapping with the first retention portion 601 as seen in the X-direction and in the Z-direction.

As shown in FIG. 9B, one of the retention portions in the respective flow channels overlaps with at least one of the other retention portions in a view of the cartridge seen along a predetermined direction. In this example, in a view of the first retention portion 601, the first retention portion 701, and the first retention portion 801 observed in the cartridge's depth direction (the Y-direction), the first retention portion 701 and the first retention portion 801 have overlap portions 90 overlapping with part of the first retention portion 601.

In this way, in the present embodiment, a first flow channel (the flow channel 400A (see FIG. 4) has a first downstream flow channel (the connection flow channel 607 (see FIGS. 6A to 6C)) communicating with a first ejection port array (an ejection port array 1101A (see FIG. 12)). The first flow channel has a first upstream flow channel (a portion of the flow channel 400A outside of the connection flow channel 607) communicating with a first filter (the filter 301A (see FIG. 3)) and the first downstream flow channel.

A second flow channel (the flow channel 400B (see FIG. 4) has a second downstream flow channel (the connection flow channel 707 (see FIGS. 7A to 7C)) communicating with a second ejection port array (an ejection port array 1101B (see FIG. 12)). The second flow channel has a second upstream flow channel (a portion of the flow channel 400B outside of the connection flow channel 707) communicating with a second filter (the filter 301B (see FIG. 3)) and the second downstream flow channel.

In a state where the liquid ejection head is in use, the first upstream flow channel includes a first region (e.g., the first retention portion 601) which is located above the first downstream flow channel vertically (the Z-direction) and which is where the cross-sectional area of the first upstream flow channel becomes smaller and smaller from an upper side to a lower side vertically. The second upstream flow channel includes a second region (e.g., the first retention portion 701) which is located above the second downstream flow channel vertically (the Z-direction) and which is where the cross-sectional area of the second upstream flow channel becomes smaller and smaller from an upper side to a lower side vertically.

In a view of the liquid ejection head seen from the front in a first direction, the first downstream flow channel and the second downstream flow channel do not overlap with each other, and a first portion communicating with the first filter and a second portion communicating with the second filter overlap with each other. For example, in a view of the liquid ejection head seen from the front in the Y-direction, the connection flow channel 607 and the connection flow channel 707 do not overlap with each other, and the second retention portion 602 communicating with the filter 301A and the second retention portion 702 communicating with the filter 301B overlap with each other.

With such an arrangement of the retention portions, each of the three retention portions can have sufficient size without the liquid ejection head (the cartridge) having to be increased in size in the width direction (the X-direction) so much. Although the flow channel 400B is assumed to be used as the second flow channel in the case described in the present embodiment, the flow channel 400C may be used as the second flow channel. This configuration too can offer advantageous effects similar to those in the case where the flow channel 400B is used.

Figure 10B:
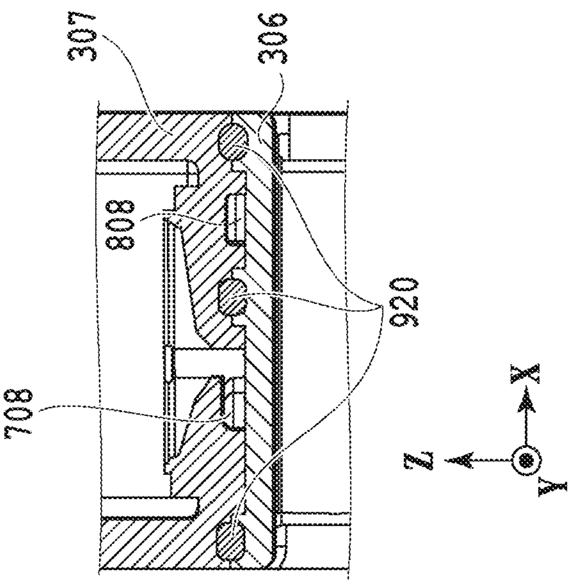
FIG. 10B is a sectional view taken along the line XB-XB in FIG. 10A.
Figure 10A:
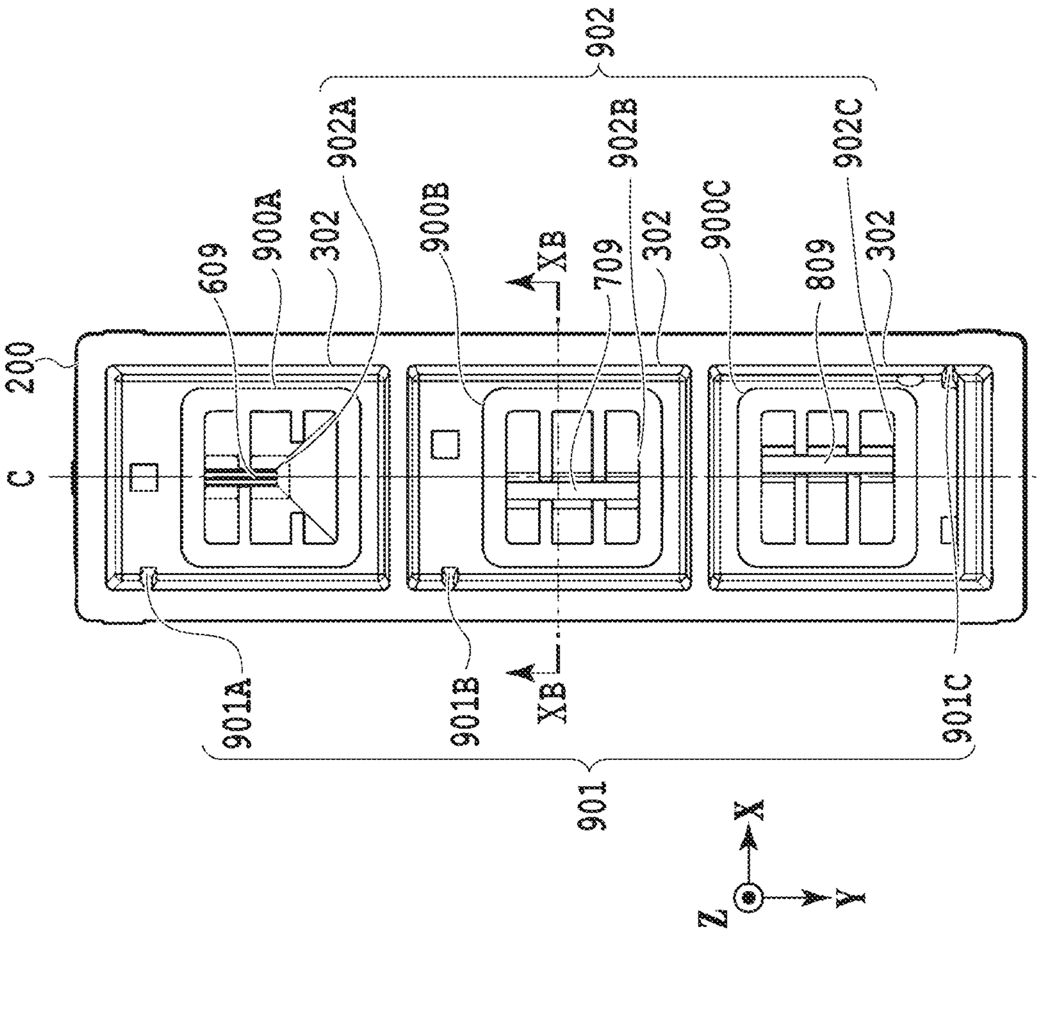
FIG. 10A is a top view of a casing of one embodiment.

FIG. 10A is a top view of the casing 200 not accommodating the absorbers or the filters. In the casing 200, an opening 900A, an opening 900B, and an opening 900C are provided on the same line extending in the Y-direction. The opening 900A is connected to the first opening portion 600 (see FIGS. 6A to 6C). The opening 900B is connected to the first opening portion 700 (see FIGS. 7A to 7C). The opening 900C is connected to the first opening portion 800 (see FIGS. 8A to 8C). The openings 900A, 900B, 900C are provided closer to the −Y-direction side (upward in FIG. 10A) so that the flow channels 400A, 400B, and 400C (see FIG. 4) may be short in length in the Y-direction. Also, a rib 901 is provided in each of the storage chambers 302 to provide atmospheric communication even with the absorber inserted therein. A rib 901A is provided in the storage chamber 302 corresponding to the opening 900A, a rib 901B is provided in the storage chamber 302 corresponding to the opening 900B, and a rib 901C is provided in the storage chamber 302 corresponding to the opening 900C.

The ribs 901 are disposed at positions in the storage chambers 302 close to the openings 900A, 900B, 900C. This helps prevent leakage of liquid from the lid 201 even in a case where air in the flow channel unit 400 or air in a clearance between the absorber 300 and the storage chamber 302 expands due to an environmental change (such as temperature or atmospheric pressure).

The second opening portion 609 of the flow channel 400A is provided on an X-direction center line C on the casing 200. Also, the second opening portion 709 of the flow channel 400B is provided at a position deviated from the center line C in the −X-direction, and the rib 901B is disposed closer to the second opening portion 709 (the left side in FIG. 10A). Also, the second opening portion 809 of the flow channel 400C is provided at a position deviated from the center line C in the +X-direction, and the rib 901C is disposed closer to the second opening portion 809 (the right side in FIG. 10A).

The amounts by which the second opening portion 709 and the second opening portion 809 are deviated from the center line C are in the range of desirably not lower than 5% to not higher than 30%, more desirably not lower than 10% to not higher than 25%, or even more desirably not lower than 15% to not higher than 20% of the width of the filter 301 in the X-direction. In the present embodiment, in relation to the filters with a width of 12 mm, the second opening portion 709 and the second opening portion 809 are each deviated by ±1 mm (8.3%) in the X-direction. Deviating the second opening portion 609 too much is undesirable because it would create a situation where it is difficult for liquid to be supplied from the side opposite from the direction in which the second opening portion 609 is deviated. For this reason, it is desirable that the second opening portions 609, 709, 809 be provided at positions close to the center line C, like in the present embodiment. Although the second opening portions 609, 709, 809 are oblong slits in shape in the present embodiment, they may have other shapes. For example, the second opening portions 609, 709, 809 may be circular, oval, or the like in shape.

In the present embodiment, the second opening portion 609 has a slit shape with two long sides extending in parallel to the cartridge's depth direction (the Y-direction). The second opening portion 609 has corner portions 902A at the four corners of the opening. In other words, the cross-sectional shape of the second opening portion 609 at least partially includes the corner portions 902A. The second opening portion 609 thus having a slit shape helps prevent a relatively large air bubble from entering the flow channel, while allowing the flow channel to have a sufficient area. In other words, the second opening portion 609 having a slit shape enables stabler supply of liquid to the ejection ports.

In the present embodiment, the second opening portion 709 has a slit shape with two long sides extending in parallel to the cartridge's depth direction (the Y-direction). The second opening portion 709 has corner portions 902B at the four corners of the opening. In other words, the cross-sectional shape of the second opening portion 709 at least partially includes the corner portions 902B. The second opening portion 709 thus having a slit shape helps prevent a relatively large air bubble from entering the flow channel, while allowing the flow channel to have a sufficient area. In other words, the second opening portion 709 having a slit shape enables stabler supply of liquid to the ejection ports.

In the present embodiment, the second opening portion 809 has a slit shape with two long sides extending in parallel to the cartridge's depth direction (the Y-direction). The second opening portion 809 has corner portions 902C at the four corners of the opening. In other words, the cross-sectional shape of the second opening portion 809 at least partially includes the corner portions 902C. The second opening portion 809 thus having a slit shape helps prevent a relatively large air bubble from entering the flow channel, while allowing the flow channel to have a sufficient area. In other words, the second opening portion 809 having a slit shape enables stabler supply of liquid to the ejection ports.

FIG. 10B is a cross-sectional view taken along the line XB-XB in FIG. 10A. The horizontal portion 708 and the horizontal portion 808 are formed by joining a first member forming the flow channel formation part 306 and a second member forming the box part 307 with a recess portion formed in the first member and a recess portion in the second member being in alignment with each other. Specifically, a resin 920 is poured into the space formed by recess portions between the flow channel formation part 306 and the box part 307, except for the recess portions forming the horizontal portion 708 and the horizontal portion 808. Thus, the horizontal portion 708 and the horizontal portion 808 are formed, and also, the flow channel formation part 306 and the box part 307 are secured to each other.

With such a bonding method, the flow channel including the horizontal portion 708 is formed in the first member forming the flow channel formation part 306 and the second member forming the box part 307, and the flow channel including the horizontal portion 808 is formed in the first member forming the flow channel formation part 306 and the second member forming the box part 307. The horizontal portion 708 and the horizontal portion 808 include a joint portion between the first member forming the flow channel formation part 306 and the second member forming the box part 307. Thus, joining the flow channel formation part 306 and the box part 307 to each other enables the flow channel to be formed without weld burrs or adhesive stick-out portion being formed on the inner wall of the horizontal portion 708.

Figure 11:
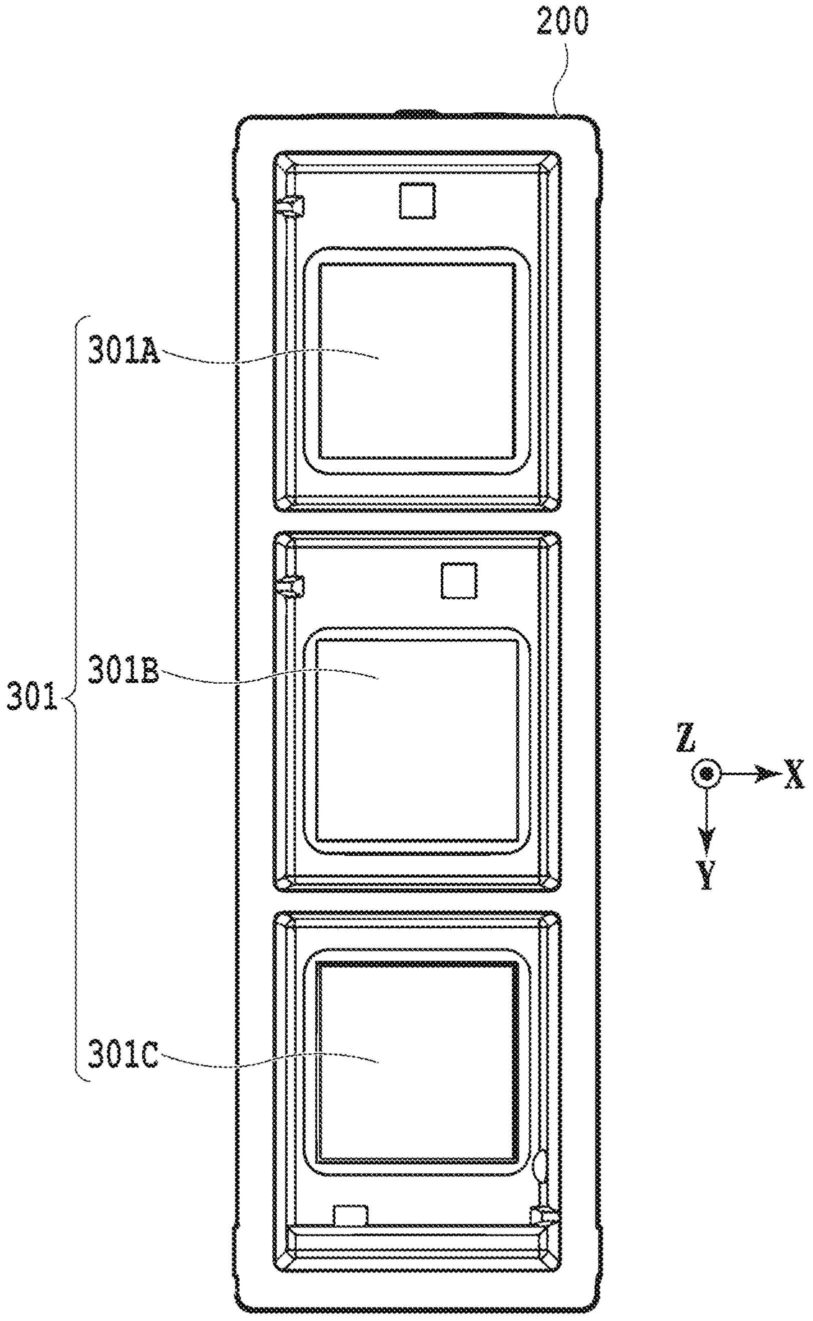
FIG. 11 is a plan view showing an example of storage chambers of one embodiment.

FIG. 11 is a top view of the casing 200 in which the filters 301 are welded. In the casing 200, the three filters 301 are welded to cover the three first opening portions described above in order to reduce intrusion of foreign matter into the second opening portions 609, 709, 809. Note that the filters 301 may be secured to the casing 200 using an adhesive or the like instead of welding. Alternatively, the casing 200 and the filters 301 may be formed integrally.

Figure 12:
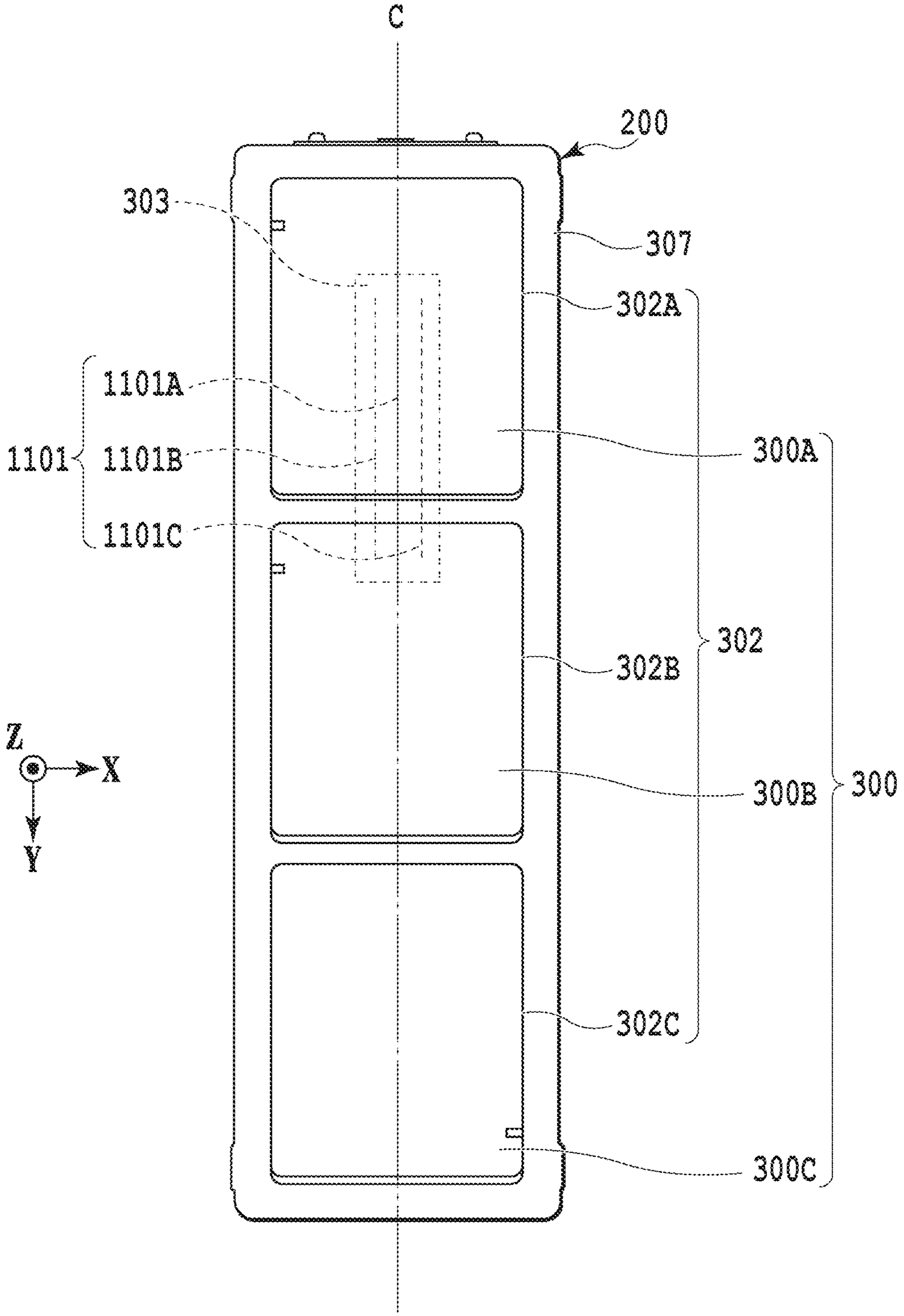
FIG. 12 is a plan view showing an example of ejection port arrays of one embodiment.

FIG. 12 is a top view of the casing 200 in which the absorbers 300 are inserted. The absorbers 300 are inserted in the storage chambers 302 in the casing 200, and liquids can be held by the absorbers 300. The liquids held by the absorbers 300 are supplied to the printing element substrate 303 through the flow channel unit. FIG. 12 shows the printing element substrate 303 and ejection port arrays 1101 with broken lines.

Liquid held in the absorber 300A is supplied to the ejection port array 1101A of the printing element substrate 303 via the flow channel 400A (see FIG. 4). Liquid held in the absorber 300B is supplied to the ejection port array 1101B of the printing element substrate 303 via the flow channel 400B (see FIG. 4). Liquid held in the absorber 300C is supplied to the ejection port array 1101C of the printing element substrate 303 via the flow channel 400C (see FIG. 4).

In the cartridge of the present embodiment, the inside of the casing 200 is divided into three sections to form the three storage chambers 302 so that the absorbers 300A, 300B, 300C may be disposed along the in X-direction center line C (the Y-direction). With the cartridge mounted on the carriage to scan, the cartridge moves in the +X- or −X-direction. The ejection port arrays 1101 each having an array of ejection ports arranged in the Y-direction are provided at the printing element substrate 303. In other words, the absorbers 300A, 300B, 300C are arranged in the same direction as the direction in which the ejection ports are arrayed and are arranged in a direction intersecting with (in the present embodiment, orthogonal to) the scan direction.

The casing 200 is formed by resin molding. The casing 200 is formed by separately molding a flow channel formation part and a box part (first molding) and then performing second molding of joining the flow channel formation part and the box part. Note that a method employed for the second molding may be one that pours resin into space created between the box part and the flow channel formation part abutting against each other or other methods such as adhesion. Flow channels can be formed in the casing 200 by molding of the flow channel formation part and the box part separately and then joining of the flow channel formation part and the box part to each other as described above. Although the storage chambers 302 are arranged at equal intervals in the present embodiment, the intervals do not have to be equal.

The width of the cartridge (the length in the X-direction) is desirably 25 mm or below. In the present embodiment, the three storage chambers 302 are disposed linearly in the Y-direction, which makes it possible for the cartridge 100 to have a smaller width than conventional cartridges. However, in view of the ease of ink supply and the ease of ink injection, it is desirable that the absorbers 300 have a width of 5 mm or greater. It is also desirable that the storage chambers 302 too have a width of 5 mm or greater in the X-direction.

Note that the width of the cartridge 100 is desirably 10 mm to 25 mm, more desirably 13 mm to 23 mm, or even more desirably 15 mm to 21 mm. The ease of ink supply is better in a case where the ratio between the width of the casing 200 in the X-direction and the length of the casing 200 in the Y-direction is such that a section of the absorber 300 taken along the XY-plane is close to a square. Thus, in a case where three storage chambers are formed like in the present embodiment, it is preferable that the ratio of the width in the X-direction to the length in the Y-direction be approximately 2:5 to 2:7. The cartridge 100 of the present embodiment is 20 mm in width in the X-direction and 70 mm in length in the Y-direction.

As described above, it is desirable that a section of the absorber 300 taken along the XY-plane be close to a square, and one side of the absorber 300 is desirably 5 mm to 25 mm, more desirably 10 mm to 23 mm, or even more desirably 15 mm to 21 mm. Considering the liquid retention capability, the height of the absorber 300 in the Z-direction should be longer than the lengths thereof in the X- and Y-directions, so that the liquid can be used up more completely. However, extending the length of the absorber 300 in the Z-direction increases the size of the cartridge and in turn increases the overall size of the apparatus. Thus, the height of the absorber 300 in the Z-direction is desirably no more than four times, more desirably no more than three times, or even more desirably no more than two times the width thereof in the X-direction or the length thereof in the Y-direction. The absorber 300 of the present embodiment is 17 mm in width in the X-direction, 21 mm in depth in the Y-direction, 33 mm in height in the Z-direction.

Figure 13:
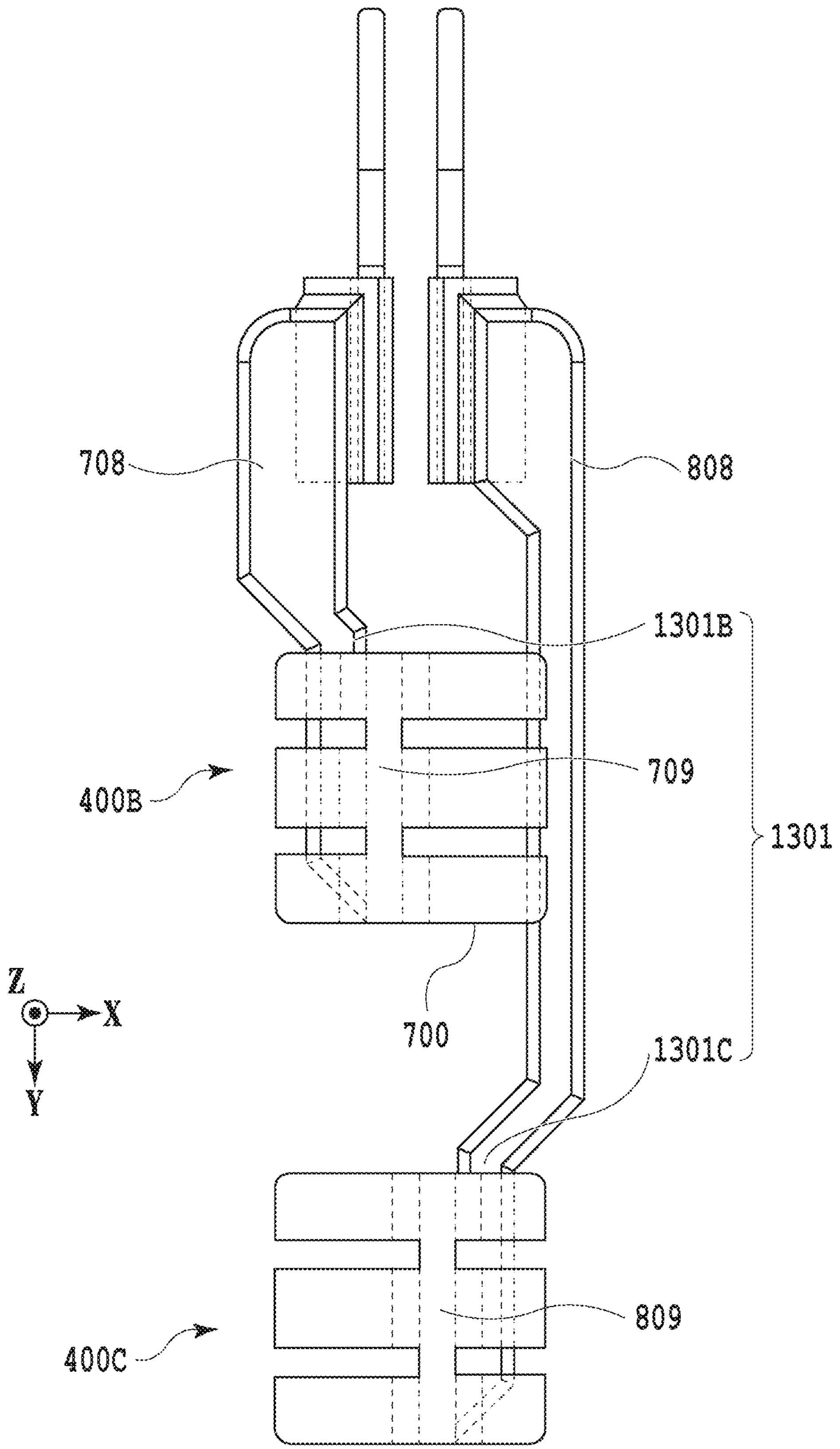
FIG. 13 is a diagram illustrating an example of flow channels of one embodiment.

FIG. 13 is a top view of the flow channel 400B and the flow channel 400C, i.e., a diagram showing the flow channel unit 400 shown in FIG. 5A without the flow channel 400A. The second opening portion 709 of the flow channel 400B and the second opening portion 809 of the flow channel 400C are each disposed at positions deviated from the X-direction center of the casing 200. Specifically, the second opening portion 709 of the flow channel 400B is disposed at a position deviated from the X-direction center of the casing 200 in the −X-direction, and the second opening portion 809 of the flow channel 400C is disposed at a position deviated from the X-direction center of the casing 200 in the +X-direction. Disposing the second opening portion 709 at such a deviated position can shorten the length of the horizontal portion 708 of the flow channel 400B extending in the Y-direction to the ejection port array and also allows the horizontal portion 808 of the flow channel 400C to be wider in the X-direction. Also, disposing the second opening portion 809 at a position deviated from the center in a direction opposite from the second opening portion 709 can shorten the length of the horizontal portion 808 of the flow channel 400C.

The absorbers 300 are accommodated in the respective storage chambers 302, and the filters 301 are provided between the absorbers 300 and the flow channel unit 400 (see FIGS. 11 and 12). For lower flow resistance, the larger the filters 301 in size, the better. The size of the filter 301 is desirably equal to or more than a half of a sectional area of the absorber 300 taken along the XY-plane, and it is more desirable that the shape of the filter 301 be close to a square. This allows the absorber 300 and the filter 301 to be in larger abutment against each other, which enables the liquid to be used up more completely. Specifically, the size of the filter 301 is desirably 30% to 90% or lower, more desirably 40% to 80%, or even more desirably 50% to 70% of a sectional area of the absorber 300 taken along the XY-plane. In the present embodiment, the size of the filter 301 is 12 mm in width in the X-direction and 12 mm in depth in the Y-direction (40% of a sectional area of the absorber taken along the XY-plane).

The flow channel 400A (see FIG. 4) is formed below the filter 301A, the flow channel 400B is formed below the filter 301B, and the flow channel 400C is formed below the filter 301C (see FIGS. 10A, 10B, and 11). Although the following description is on the flow channel 400B, the same applies to the flow channel 400A and the flow channel 400C as well.

Referring back to FIGS. 7A to 7C, liquid that has passed through the filter 301B passes through the first opening portion 700 of the flow channel 400B and enters the second opening portion 709. The second opening portion 709 is desirably provided near an X-direction center portion of the filter 301 so that the liquid will be less likely to be stagnant in the space under the filter 301B.

The space from the first opening portion 700 to the second opening portion 709 is the second retention portion 702 for retaining air bubbles. In the second retention portion 702, to make it easier for air bubbles to move upwards, the second opening portion 709 has a small width in the X-direction, or specifically, is narrower than the width of the first opening portion 700 in the X-direction. However, in a case where the second opening portion 709 has too small a width in the X-direction, the flow resistance is increased. For this reason, the width of the second opening portion 709 in the X-direction is desirably 10% to 60%, more desirably 10% to 40%, or even more desirably 10% to 20% of the width of the filter 301B in the X-direction. In the present embodiment, the second opening portion 709 is 1.3 mm in width in the X-direction (10.8% of the width of the filter in the X-direction).

Note that a width-reduced portion 1301B with a reduced flow channel width may be provided at part of the horizontal portion 708. A width-reduced portion 1301C may be provided at part of the horizontal portion 808. Reducing the width of the flow channel provides resistance, which can reduce oscillating pressure to be described later. Reducing the width of the width-reduced portions 1301 too much increases flow resistance during ink supply. Thus, for a flow channel which is approximately 50 mm in length, the width is desirably 1 mm or greater, more desirably 1.5 mm or greater, or even more desirably 2 mm or greater. Meanwhile, making the flow channel width too thick at the width-reduced portion 1301 increases the width of the cartridge. Thus, it is preferable that the width of the width-reduced portion 1301 be 3 mm or smaller at most.

Also, the longer the path from the absorber to the ejection port array, the more influence the oscillating pressure will have. Thus, the width-reduced portion 1301C may be provided only at the flow channel 400C which is farther away from the printing element substrate. In this way, variation in the oscillating pressure among the flow channels 400A, 400B, 400C shown in FIG. 4 is reduced to achieve stable ejection and less degradation in print quality.

Figure 14A:
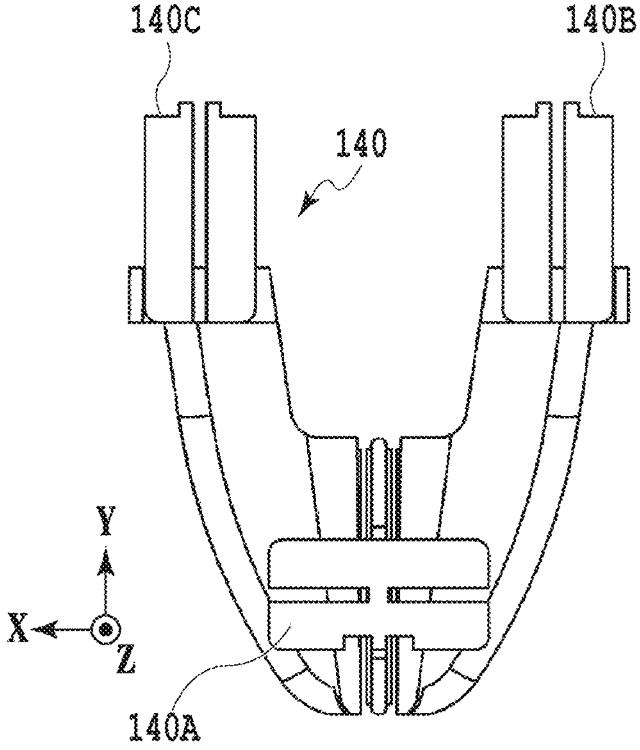
FIG. 14A is a top view of a conventional flow channel unit.
Figure 14B:
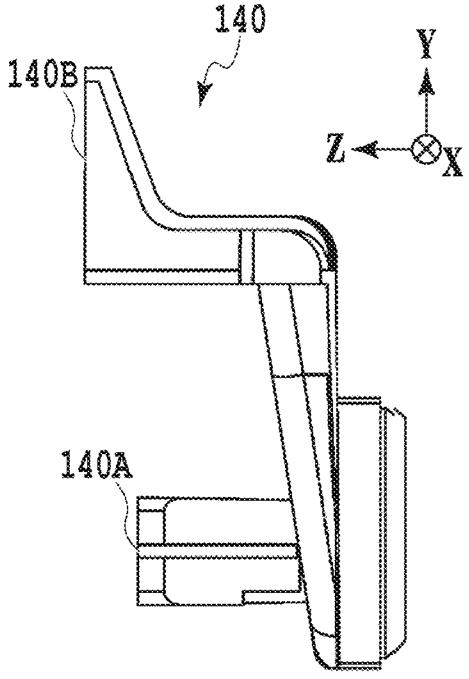
FIG. 14B is a side view of the flow channel unit shown in FIG. 14A.
Figure 14C:
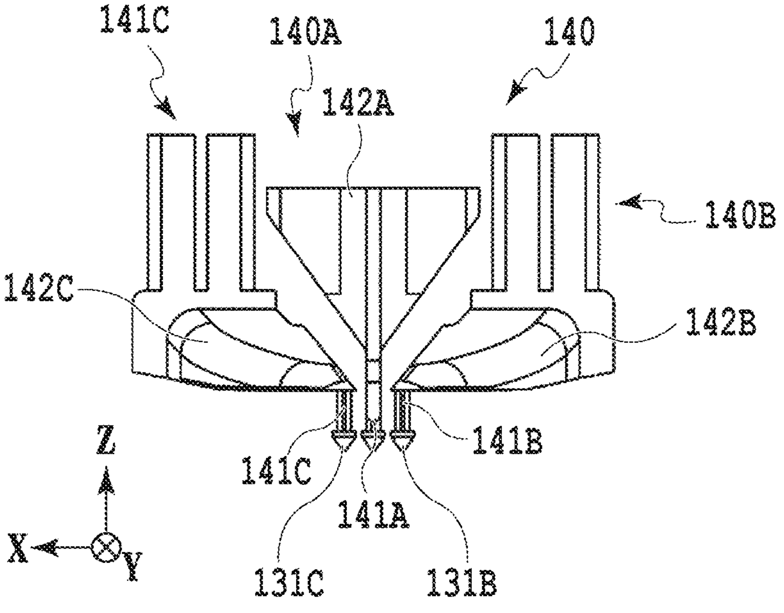
FIG. 14C is a back view of the flow channel unit shown in FIG. 14A.

FIG. 14A is a top view of a flow channel unit 140, which is an extracted model of a flow-channel space formed between conventional absorbers and ejection port arrays. FIG. 14B is a side view of the flow channel unit 140 shown in FIG. 14A. FIG. 14C is a back view of the flow channel unit 140 shown in FIG. 14A.

Liquids that the conventional absorbers hold are supplied to the ejection port arrays at the printing element substrate via the flow channel unit 140. The flow channel unit 140 includes three flow channels.

A flow channel 140B connecting the absorber to the ejection port array is disposed at the rightmost side in FIG. 14C, a flow channel 140C connecting the absorber to the ejection port array is disposed at the leftmost side, and a flow channel 140A connecting the absorber to the ejection port array is disposed in such a manner as to be sandwiched by the flow channels 140B and 140C. Thus, in the present example, the storage chambers and the absorbers for supplying liquid to the flow channels 140A, 140B, 140C are disposed immediately above (directly above in the Z-direction) the flow channels 140A, 140B, 140C, respectively.

A case is discussed here where a conventional cartridge mounted to a carriage scans in the +X-direction. In this case, upon acceleration of the carriage, inertia force acts on the liquids held by the absorbers in a direction (the −X-direction) opposite from the scan direction. Then upon deceleration of the carriage, inertia force acts on the liquids held by the absorbers in a direction (the +X-direction) opposite from the above. Further, in the event where the carriage scans in the −X-direction, inertia force acts in directions reversed from the above directions upon acceleration and deceleration, respectively. In other words, every time the carriage scans, force in the +X-direction and force in the −X-direction act on the absorbers alternately, causing the liquids held by the absorbers to oscillate in the +X- and −X-directions every time. As a result, pressure of the liquids supplied to the flow channel 140B and the flow channel 140C fluctuates, and this pressure fluctuation affects the ejection states of the ejection port arrays 131B and 131C. Such pressure change is greater as the amount of deviation is larger between the barycenter of the absorber and the ejection port array in the scan direction (the X-direction).

Also, while force in the +X-direction is acting on the cartridge, the ejection port array 131B is in an increased-pressure state, and the ejection port array 131C is in a reduced-pressure state. While force in the −X-direction is acting on the cartridge, the ejection port array 131B is in a reduced-pressure state, and the ejection port array 131C is in an increased-pressure state. Because the state of pressure increase and pressure reduction is thus different between the ink colors too, there is a possibility of degradation of the quality of an image represented on a printing medium. Pressure that the liquid in a flow channel receives from the liquid held by the absorber is hereinafter referred to as oscillating pressure.

Figure 15:
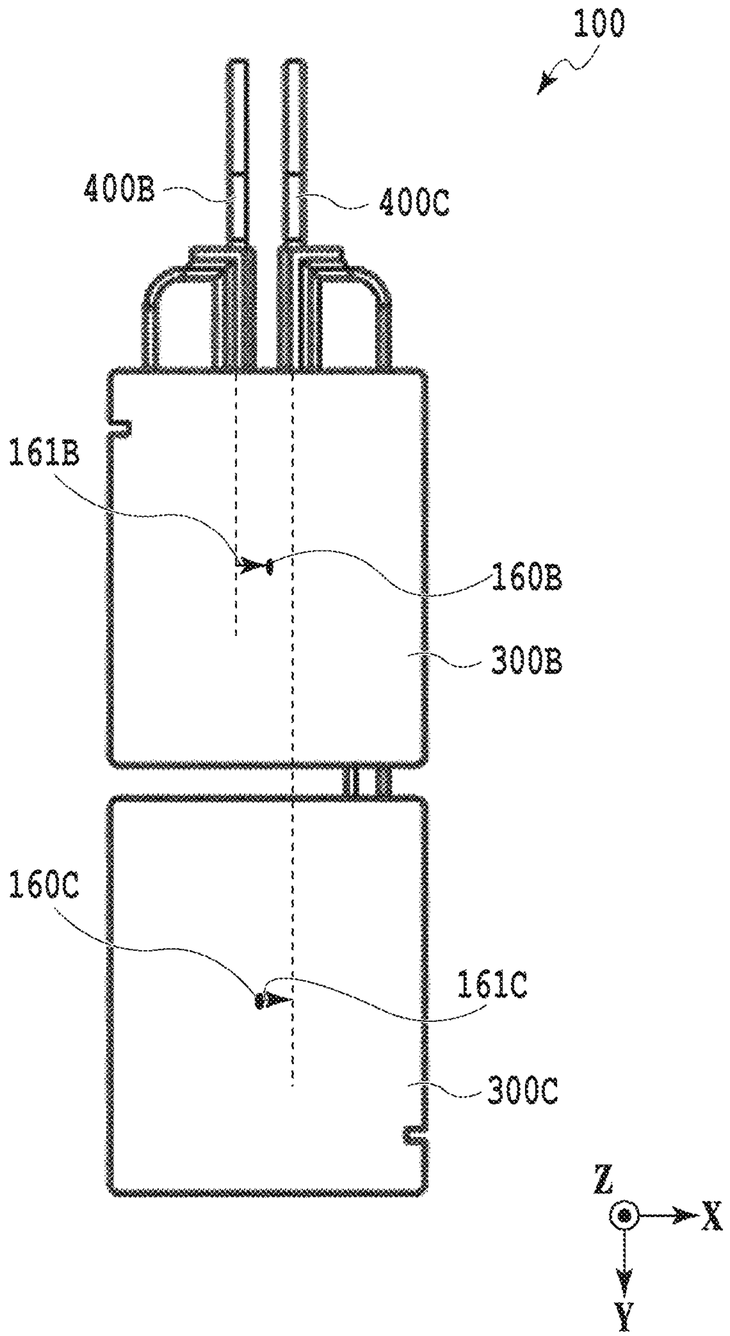
FIG. 15 is a diagram illustrating oscillating pressure of one embodiment.

FIG. 15 is a top view of the flow channel 400B, the flow channel 400C, the absorber 300B corresponding to the flow channel 400B, and the absorber 300C corresponding to the flow channel 400C in the cartridge 100 of the present embodiment. FIG. 15 too denotes the extended lines of the ejection port array 1101B and the ejection port array 1101C (neither shown) with dotted lines.

The following describes an example of how force acts on the cartridge 100 in the +X-direction upon movement of the carriage. The ejection port array 1101B that ejects liquid supplied from the flow channel 400B is provided at a position deviated in the −X-direction from a barycenter 160B of the absorber 300B holding the liquid to be supplied to the flow channel 400B. The ejection port array 1101B is supplied with the liquid from the absorber 300B via the flow channel 400B. Although the barycenter 160B and the ejection port array 1101B are deviated from each other in the X-direction, the amount of deviation is small compared to the conventional example described above, i.e., a configuration in which the barycenters of the absorbers are not arranged linearly in a direction orthogonal to the scan direction.

Also, the ejection port array 1101C that ejects liquid supplied from the flow channel 400C is provided at a position deviated in the +X-direction from a barycenter 160C of the absorber 300C holding the liquid to be supplied to the flow channel 400C. The ejection port array 1101C is supplied with liquid from the absorber 300C via the flow channel 400C. Although the barycenter 160C and the ejection port array 1101C are deviated from each other in the X-direction, the amount of deviation is small compared to the conventional example described above, i.e., a configuration in which the barycenters of the absorbers are not arranged linearly in a direction orthogonal to the scan direction.

While the cartridge 100 is receiving force in the X-direction, as shown in FIG. 15, oscillating pressure 161B acts on the ejection port array 1101B in a direction toward the barycenter 160B of the absorber 300B. Thus, the ejection port array 1101B is brought into a reduced-pressure state. Meanwhile, oscillating pressure 161C acts on the ejection port array 1101C in a direction from a barycenter 130C of the absorber 300C. Thus, the ejection port array 1101C is brought into an increased-pressure state.

Note that in the present embodiment, the absorbers 300A, 300B, 300C (see FIG. 3) are arranged linearly in the Y-direction. The linear arrangement of the absorbers can make the amounts of deviation of the ejection port arrays 1101B and 1101C (see FIG. 12) from the barycenters of the absorbers 300B, 300C in the X-direction smaller than those in the prior art. This can reduce oscillating pressure exerted on the ejection port arrays, which helps achieve less unstable ejection and less degradation in print quality.

In this manner, in the cartridge, the positions of the barycenters of the plurality of absorbers are arranged linearly in a direction in which the ejection ports of the ejection port array are arrayed. Thus, the cartridge and the printing apparatus provided cause less increase in the size of the apparatus. Further, less unstable ejection and less degradation in print quality are achieved.

FIGS. 16A to 16D are conceptual diagrams showing the insides of molds used for manufacturing the cartridge of the present embodiment. An in-mold shaping technique is used as methods for pouring the resin 920 (see FIG. 10B). The in-mold shaping technique is described step by step.

In the present embodiment, a first mold 1601 having a mold for forming the flow channel formation part 306 and a second mold 1602 having a mold forming the box part 307 are used. The first mold 1601 is a mold on the fixed side, and the second mold 1602 is a mode on the movable side.

Figures 16A, 16B, 16C, 16D:
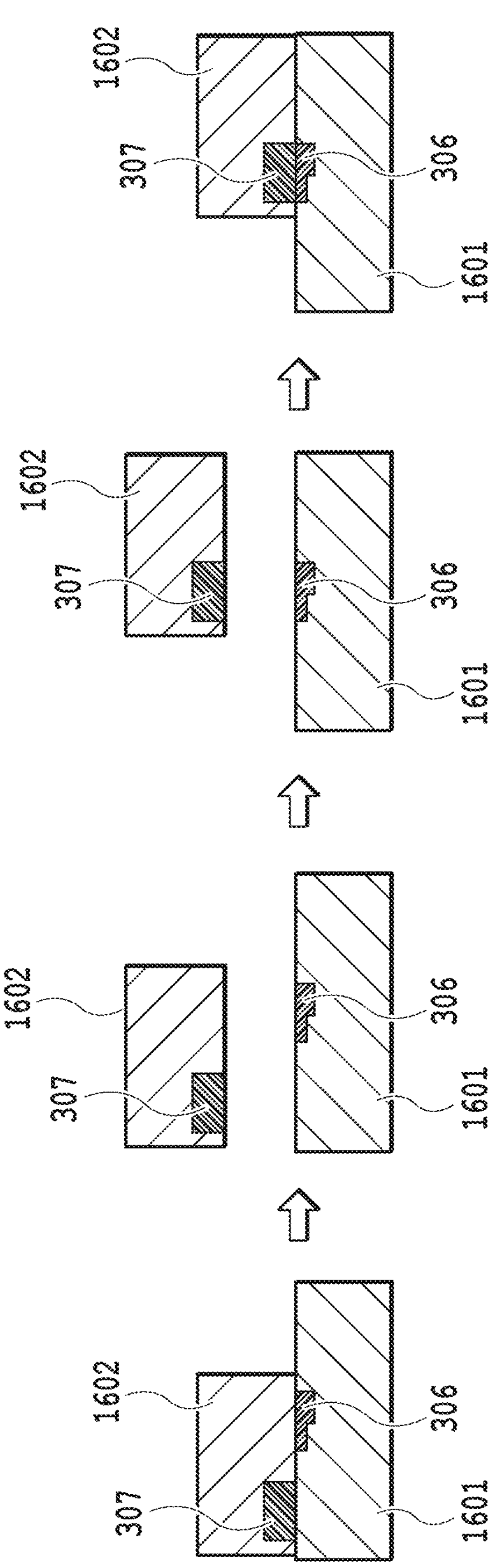
FIGS. 16A to 16D are conceptual diagrams of the inside of molds used to manufacture the cartridge of one embodiment.

First, as shown in FIG. 16A, the first mold 1601 on the fixed side and the second mold 1602 on the movable side are joined, and a mold formed by them is filled with a resin poured from a first gate disposed at the first mold 1601. The first member forming the flow channel formation part 306 and the second member forming the box part 307 are then shaped.

Next, as shown in FIG. 16B, the molds are opened. Then, the first member forming the flow channel formation part 306 is left in the first mold 1601, and the second member forming the box part 307 is left in the second mold 1602.

Next, as shown in FIG. 16C, the second mold 1602 is moved to position the second member forming the box part 307 above the first member forming the flow channel formation part 306 left in the first mold 1601.

Next, as shown in FIG. 16D, the second mold 1602 is lowered to close the first mold 1601 with the second mold 1602, with the position of the flow channel formation part 306 and the position of the box part 307 in alignment with each other. As a result of the first mold 1601 being closed with the second mold 1602, the first member forming the flow channel formation part 306 left in the first mold 1601 and the box part 307 left in the second mold 1602 are disposed in the molds, combined with each other.

Next, a melted resin 920 (see FIG. 10B) is poured from a second gate disposed at the first member forming the flow channel formation part 306, thereby joining the flow channel formation part 306 and the box part 307 to each other. Lastly, the molds are opened again, and a member having the flow channel formation part 306 and the box part 307 joined to each other is removed from the molds.

With such an in-mold shaping technique, the flow channel formation part 306 and the box part 307 are shaped and joined inside the molds, and therefore, the first member forming the flow channel formation part 306 and the second member forming the box part 307 can be joined to each other inexpensively and precisely.

As described above, according to the cartridge of the present embodiment, one of the three first retention portions which is located at the center is disposed to overlap with each of the two first retention portions located on the left and right of the first retention portion, in a view of the cartridge observed in the depth direction. More specifically, in each of the three flow channels, the first retention portion having a function to retain air bubbles and having a larger width than the other regions is provided at a position upstream of the connection flow channel. Then, in a view of the cartridge seen in the ejection port array direction (the Y-direction), one of the three first retention portions which is located at the center is disposed to partially overlap with the other two first retention portions. Forming the three flow channels to satisfy such conditions allows the overall width of the flow channel unit to be small compared to the prior art.

Thus, according to the cartridge of the present embodiment, air bubbles are generated less even in a case where a plurality of flow channels are disposed, and the cartridge is thin compared to the prior art.

Further, according to the cartridge of the present embodiment, in a case where air bubbles are generated in the liquid in the flow channels, the air bubbles are retained in the first retention portions, the second retention portions, or both. Then, before a print operation, the air bubbles retained in the first retention portions, the second retention portions, or both are discharged after fairly large quantities of air bubbles accumulate. Thus, according to the cartridge of the present embodiment, air bubbles can be removed without frequency restoration operations.

Although the present embodiment described a cartridge-type (detachable-type) liquid ejection head having liquid storage chambers, the technique of the present disclosure is not limited to this and can be applied to a permanent-type liquid ejection head having no liquid storage chambers. In a case of a permanent-type liquid ejection head, liquid supplied to the liquid ejection head may be supplied from a tank in the main body of the printing apparatus or may be supplied from a liquid cartridge mounted to the liquid ejection head.

Second Embodiment

A second embodiment of the technique of the present disclosure is described below with reference to the drawings. The cartridge of the present embodiment differs from that of the first embodiment in the arrangement of the storage chambers. In the first embodiment, the three storage chambers are arranged linearly. By contrast, in the present embodiment, the three storage chambers are arranged in the shape of the letter T. The following description focuses mainly on differences, denoting configurations that are the same as or corresponding to those in the first embodiment with the same reference numerals as those used in the first embodiment and omitting descriptions thereof.

Figure 17A:
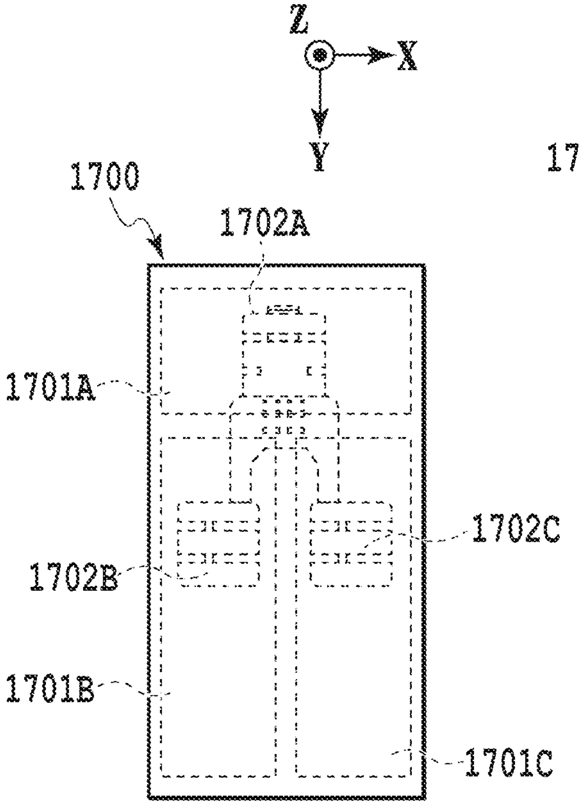
FIG. 17A is a schematic transparent top view of the cartridge of one embodiment.
Figure 17B:
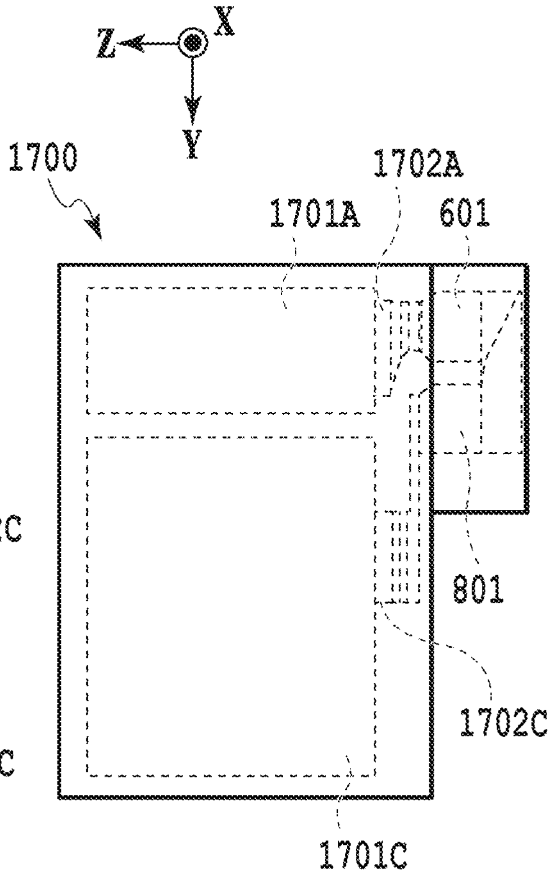
FIG. 17B is a schematic transparent side view of the cartridge of one embodiment.
Figure 17C:
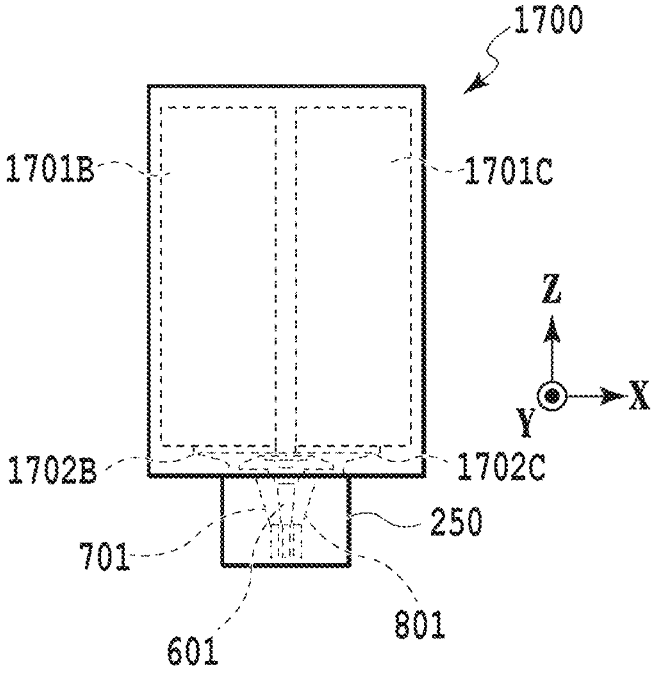
FIG. 17C is a schematic transparent front view of the cartridge of one embodiment.

FIG. 17A is a schematic transparent top view of a cartridge 1700 of the present embodiment. FIG. 17B is a schematic transparent side view of the cartridge 1700 of the present embodiment. FIG. 17C is a schematic transparent front view of the cartridge 1700 of the present embodiment.

As shown in FIG. 17A, in the present embodiment, the inside of the cartridge 1700 is divided into a letter-T shape such that the three storage chambers may be adjacent to one another. In the sections thus divided, a first storage chamber 1701A, a second storage chamber 1701B, and a third storage chamber 1701C are provided. Absorbers are accommodated in the first storage chamber 1701A, the second storage chamber 1701B, and the third storage chamber 1701C, holding different types of liquid from one another. The second storage chamber 1701B and the third storage chamber 1701C are disposed side by side in the width direction of the cartridge 1700 (the X-direction). The first storage chamber 1701A is disposed at the rear side of the second storage chamber 1701B and the third storage chamber 1701C (the upper side in the example in FIG. 17A).

As shown in FIGS. 17B and 17C, the first storage chamber 1701A is connected to a first opening portion 1702A. A first flow channel is formed, extending continuously from the first opening portion 1702A to the printing element substrate. The second storage chamber 1701B is connected to a first opening portion 1702B. A second flow channel is formed, extending continuously from the first opening portion 1702B to the printing element substrate. The third storage chamber 1701C is connected to a first opening portion 1702C. A third flow channel is formed, extending continuously from the first opening portion 1702C to the printing element substrate.

Figure 18:
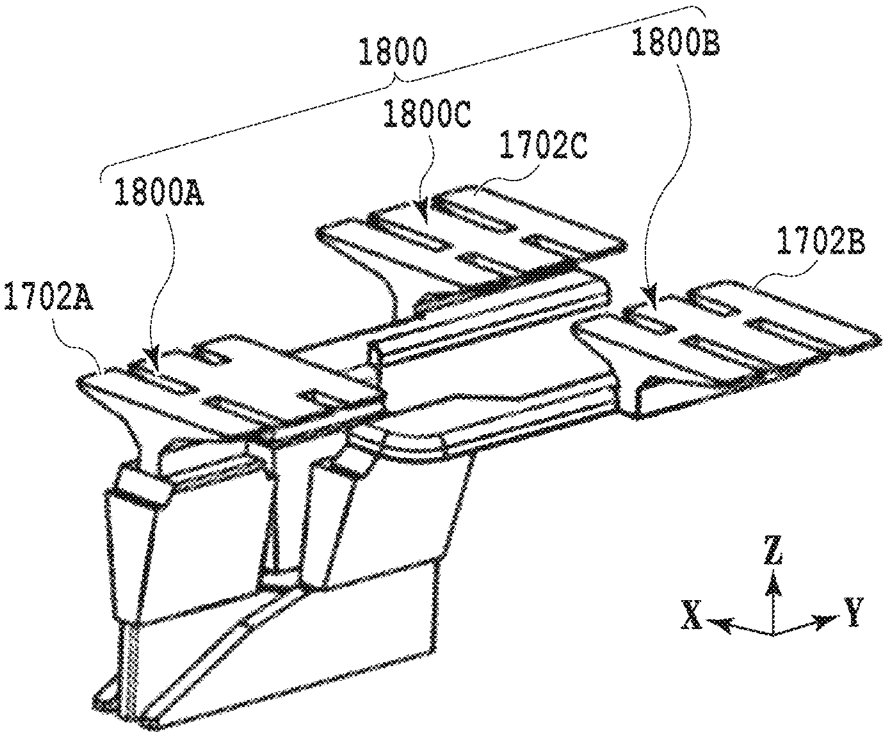
FIG. 18 is a perspective view showing an example of a flow channel unit of one embodiment.

FIG. 18 is a perspective view of a flow channel unit 1800, which is a model of a liquid flow channel space extracted from the casing in the present embodiment. The flow channel unit 1800 is a model of an extraction of ink flow channels.

As shown in FIG. 18, the flow channel unit 1800 includes a first flow channel 1800A having the first opening portion 1702A, a second flow channel 1800B having the first opening portion 1702B, and a third flow channel 1800C having the first opening portion 1702C.

The first flow channel 1800A is formed to be able to supply a liquid of a first type from the first storage chamber to the printing element substrate independently. The second flow channel 1800B is formed to be able to supply a liquid of a second type from the second storage chamber to the printing element substrate independently. The third flow channel 1800C is formed to be able to supply liquid of a third type from the third storage chamber to the printing element substrate independently.

Figure 19A:
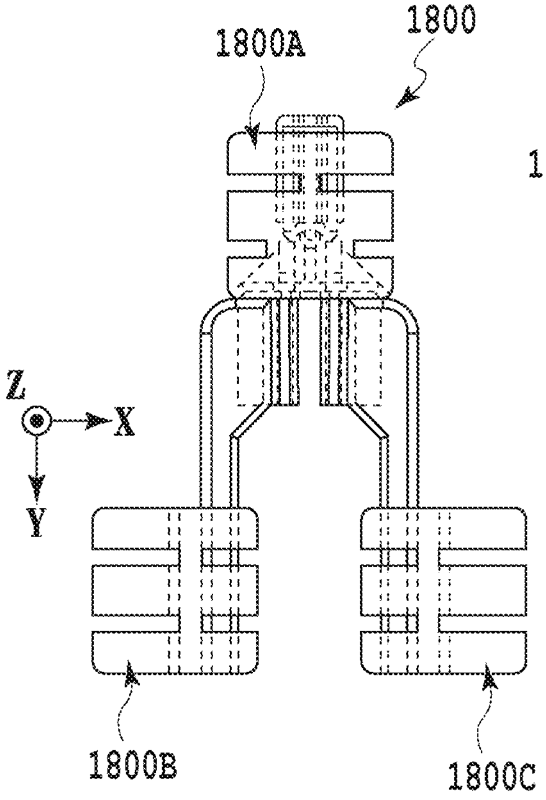
FIG. 19A is a top view of the flow channel unit of one embodiment.
Figure 19B:
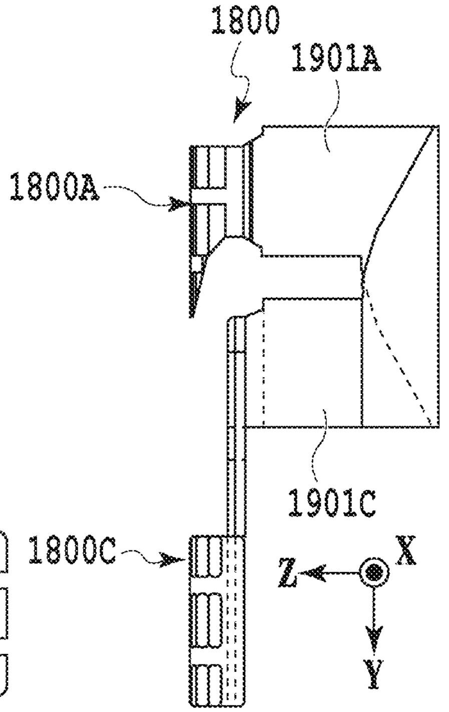
FIG. 19B is a side view of the flow channel unit of one embodiment.
Figure 19C:
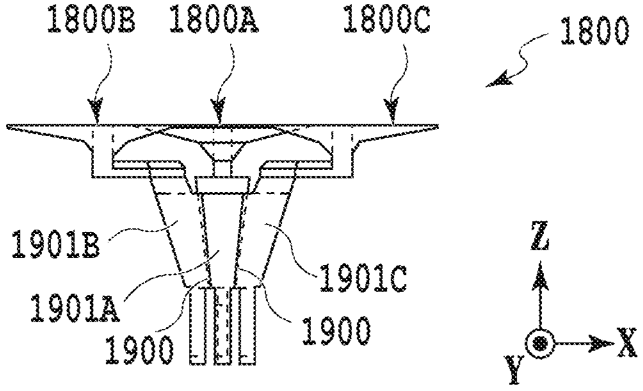
FIG. 19C is a front view of the flow channel unit of one embodiment.

FIG. 19A is a top view of the flow channel unit 1800, FIG. 19B is a side view of the flow channel unit 1800, and FIG. 19C is a front view of the flow channel unit 1800.

As shown in FIGS. 19A to 19C, the first flow channel 1800A has a first retention portion 1901A which is wider than the other regions and capable of retaining air bubbles generated upon ejection and the like. The second flow channel 1800B has a first retention portion 1901B which is wider than the other regions and capable of retaining air bubbles generated upon ejection and the like. The third flow channel 1800C has a first retention portion 1901C which is wider than the other regions and capable of retaining air bubbles generated upon ejection and the like.

In a view of the first retention portion 1901A, the first retention portion 1901B, and the first retention portion 1901C observed in the cartridge's depth direction as shown in FIG. 19C, the first retention portion 1901B and the first retention portion 1901C have an overlap portion 1900 partially overlapping with the first retention portion 1901A.

In this way, according to the cartridge of the present embodiment as well, air bubbles are generated less even in a case where a plurality of flow channels are arranged, and the cartridge is thin compared to the prior art.

Other Embodiments

In the example in FIG. 9B, the left and right side surfaces of the first retention portion 601 are slanted relative to the vertical direction (the Z-direction). However, one of the left and right side surfaces of the first retention portion 601 may extend in the vertical direction. Also, although the left and right side surfaces of the first retention portion 701 are slanted relative to the vertical direction (the Z-direction), one of the left and right side surfaces of the first retention portion 701 may extend in the vertical direction. Also, although the left and right side surfaces of the first retention portion 801 are slanted relative to the vertical direction (the Z-direction), one of the left and right side surfaces of the first retention portion 801 may extend in the vertical direction. The width of the main body of the cartridge can be made thin with such a configuration as well.

In the first embodiment, the first retention portion 601 is used as the first region of the first upstream flow channel where the sectional area of the first upstream flow channel becomes smaller and smaller from the upper side to the lower side in the vertical direction. Alternatively, the second retention portion 602 may be used as the first region. Advantageous effects similar to those in the first embodiment can also be offered with the configuration in which the sectional area of the first upstream flow channel is reduced by the first tapered portion 605 and the second tapered portion 606 of the second retention portion 602.

Also, in the first embodiment, the first retention portion 701 is used as the second region of the second upstream flow channel where the sectional area of the second upstream flow channel becomes smaller and smaller from the upper side to the lower side in the vertical direction. Alternatively, the second retention portion 702 may be used as the second region. Advantageous effects similar to those in the first embodiment can also be offered with the configuration in which the sectional area of the first upstream flow channel is reduced by the first tapered portion 705 and the second tapered portion 706 of the second retention portion 702.

Also, the second retention portion 802 may be used as the second region. The third upstream flow channel (a portion of the flow channel 400C outside of the connection flow channel 807) may be reduced in sectional area by the first tapered portion 805 and the second tapered portion 806 of the second retention portion 802. Advantageous effects similar to those in the first embodiment can also be offered with such a configuration.

According to the liquid ejection head of the present disclosure, even in a case where a plurality of flow channels are arranged, air bubbles are generated less, and the liquid ejection head is thin compared to the prior art.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-112261, filed Jul. 7, 2023, and No. 2024-066874, filed Apr. 17, 2024, which are hereby incorporated by reference herein in their entirety.

What is claimed is:

1. A liquid ejection head comprising:

a first ejection port array and a second ejection port array arranged side by side and each formed by a plurality of ejection ports for ejecting liquid arrayed in a first direction;

a first filter configured to filter a liquid to be supplied to the first ejection port array;

a second filter configured to filter a liquid to be supplied to the second ejection port array;

a first flow channel configured to supply the liquid from the first filter to the first ejection port array; and a second flow channel configured to supply the liquid from the second filter to the second ejection port array, wherein the first flow channel includes a first downstream flow channel communicating with the first ejection port array and a first upstream flow channel communicating with the first filter and the first downstream flow channel, the second flow channel includes a second downstream flow channel communicating with the second ejection port array and a second upstream flow channel communicating with the second filter and the second downstream flow channel, in a state where the liquid ejection head is in use, the first upstream flow channel has a first region which is located above the first downstream flow channel in a vertical direction and which is where a sectional area of the first upstream flow channel decreases from an upper side to a lower side in the vertical direction, and the second upstream flow channel has a second region which is located above the second downstream flow channel in the vertical direction and which is where a sectional area of the second upstream flow channel decreases from an upper side to a lower side in the vertical direction, and as viewed in the first direction, the first downstream flow channel and the second downstream flow channel do not overlap with each other, while the first region and the second region overlap with each other.

2. The liquid ejection head according to claim 1, further comprising:

a first storage chamber communicating with the first upstream flow channel and configured to store the liquid; and a second storage chamber communicating with the second upstream flow channel and configured to store the liquid, wherein the first filter is disposed in the first storage chamber, and the second filter is disposed in the second storage chamber.

3. The liquid ejection head according to claim 2, wherein in the state where the liquid ejection head is in use, the first storage chamber and the second storage chamber do not overlap with each other as viewed in a second direction intersecting with the vertical direction and the first direction.

4. The liquid ejection head according to claim 3, wherein the first downstream flow channel has:

a first opening communicating with the first ejection port array, and a second opening communicating with the first upstream flow channel, and a length of the first opening in the first direction is longer than a length of the second opening in the second direction.

5. The liquid ejection head according to claim 4, wherein the first downstream flow channel has a first tapered portion extending in the first direction and slanted relative to the first opening.

6. The liquid ejection head according to claim 5, wherein the first tapered portion includes:

a first slanted portion formed from one end portion in the first direction toward the first upstream flow channel and a second slanted portion formed continuously from another end portion of the first slanted portion in the first direction, and the first slanted portion and the second slanted portion are slanted relative to the first opening at different angles from each other.

7. The liquid ejection head according to claim 5, wherein the second downstream flow channel has a second tapered portion extending in the first direction and slanted relative to the first opening, and as viewed along the first direction, the first tapered portion and the second tapered portion arranged in the second direction are disposed facing opposite directions alternately in the first direction.

8. The liquid ejection head according to claim 2, wherein liquids of different types are stored in the first storage chamber and the second storage chamber.

9. The liquid ejection head according to claim 1, wherein the first downstream flow channel has a wall surface extending in the vertical direction in the state where the liquid ejection head is in use.

10. The liquid ejection head according to claim 1, wherein the first upstream flow channel includes a first portion communicating with the first filter and a second portion communicating with the first portion and the first downstream flow channel, the first portion and the second portion respectively include regions where sectional areas of the first portion and the second portion decrease from an upper side to a lower side in the vertical direction in the state where the liquid ejection head is in use, and the second portion includes the first region.

11. The liquid ejection head according to claim 10, wherein an opening communicating with the first portion is formed at an uppermost surface of the second portion in the state where the liquid ejection head is in use.

12. The liquid ejection head according to claim 10, wherein an opening communicating with the first downstream flow channel is formed at a lowermost surface of the second portion in the state where the liquid ejection head is in use.

13. The liquid ejection head according to claim 10, wherein the second upstream flow channel includes a third portion communicating with the second filter and a fourth portion communicating with the third portion and the second downstream flow channel, the third portion and the fourth portion respectively include regions where sectional areas of the third portion and the fourth portion decrease from an upper side to a lower side in the vertical direction in the state where the liquid ejection head is in use, and the fourth portion includes the second region.

14. A printing apparatus comprising:

a liquid ejection head which comprises a first ejection port array and a second ejection port array arranged side by side and each formed by a plurality of ejection ports for ejecting liquid arrayed in a first direction, a first filter configured to filter a liquid to be supplied to the first ejection port array, a second filter configured to filter a liquid to be supplied to the second ejection port array, a first flow channel configured to supply the liquid from the first filter to the first ejection port array, and a second flow channel configured to supply the liquid from the second filter to the second ejection port array; and an attachment unit capable of attaching the liquid ejection head, wherein the first flow channel includes a first downstream flow channel communicating with the first ejection port array and a first upstream flow channel communicating with the first filter and the first downstream flow channel, the second flow channel includes a second downstream flow channel communicating with the second ejection port array and a second upstream flow channel communicating with the second filter and the second downstream flow channel, in a state where the liquid ejection head is in use, the first upstream flow channel has a first region which is located above the first downstream flow channel in a vertical direction and which is where a sectional area of the first upstream flow channel decreases from an upper side to a lower side in the vertical direction, and the second upstream flow channel has a second region which is located above the second downstream flow channel in the vertical direction and which is where a sectional area of the second upstream flow channel decreases from an upper side to a lower side in the vertical direction, and as viewed in the first direction, the first downstream flow channel and the second downstream flow channel do not overlap with each other, while the first region and the second region overlap with each other.

* * * * *